(12) United States Patent
Yoshioka

(10) Patent No.: US 9,382,824 B2
(45) Date of Patent: Jul. 5, 2016

(54) FAILURE DETECTION DEVICE FOR BLOW-BY GAS RECIRCULATION APPARATUS OF ENGINE

(71) Applicant: AISAN KOGYO KABUSHIKI KAISHA, Obu-shi, Aichi (JP)

(72) Inventor: Mamoru Yoshioka, Nagoya (JP)

(73) Assignee: AISAN KOGYO KABUSHIKI KAISHA, Obu-shi (JP)

( * ) Notice: Subject to any disclaimer, the term of this patent is extended or adjusted under 35 U.S.C. 154(b) by 128 days.

(21) Appl. No.: 14/331,566

(22) Filed: Jul. 15, 2014

(65) Prior Publication Data

US 2015/0040878 A1 Feb. 12, 2015

(30) Foreign Application Priority Data

Aug. 9, 2013 (JP) .................................. 2013-166352

(51) Int. Cl.

| | |
|---|---|
| *F02B 25/06* | (2006.01) |
| *F01M 13/00* | (2006.01) |
| *G01M 15/09* | (2006.01) |
| *G01M 3/02* | (2006.01) |
| *F02B 75/22* | (2006.01) |
| *F02M 25/06* | (2016.01) |
| *F01M 13/04* | (2006.01) |
| *F01M 13/02* | (2006.01) |

(52) U.S. Cl.
CPC ........... *F01M 13/0011* (2013.01); *G01M 3/025* (2013.01); *G01M 15/09* (2013.01); *F01M 13/023* (2013.01); *F01M 13/04* (2013.01); *F01M 2013/0044* (2013.01); *F02B 75/22* (2013.01); *F02M 25/06* (2013.01)

(58) Field of Classification Search
CPC . F01M 13/023; F01M 13/04; F01M 13/0011; F02M 25/06; F02B 75/22
USPC .......................................................... 123/574
See application file for complete search history.

(56) References Cited

U.S. PATENT DOCUMENTS

| | | | | |
|---|---|---|---|---|
| 2004/0045538 A1* | 3/2004 | Tagami | ................... | F02M 25/08 123/520 |
| 2008/0202482 A1 | 8/2008 | Furuta et al. | | |
| 2008/0314029 A1* | 12/2008 | Okugawa | .............. | F02D 41/029 60/286 |
| 2009/0235907 A1* | 9/2009 | Satou | ................. | F01M 13/0011 123/574 |
| 2010/0192914 A1* | 8/2010 | Achleitner | .............. | F02D 41/20 123/478 |

(Continued)

FOREIGN PATENT DOCUMENTS

| | | |
|---|---|---|
| JP | A-10-184336 | 7/1998 |
| JP | A-2008-208781 | 9/2008 |
| JP | A-2010-196594 | 9/2010 |

(Continued)

*Primary Examiner* — Lindsay Low
*Assistant Examiner* — Charles Brauch
(74) *Attorney, Agent, or Firm* — Oliff PLC

(57) ABSTRACT

An engine includes a EGR valve to regulate a EGR flow rate. A blow-by gas recirculation passage allows blow-by gas generated in the engine to flow in a surge tank to return to the engine. A PCV valve operates in response to negative pressure to regulate a blow-by gas flow rate in the recirculation passage. During deceleration fuel cutoff of the engine, an ECU holds a throttle valve at a predetermined slight opening degree and controls the EGR valve to be forcibly opened from a valve-closed state to change intake pressure (negative pressure) in the surge tank and determines whether or not the PCV valve is in sticking failure based on changes in intake amount detected by an air flow meter before and after the negative pressure changes.

11 Claims, 11 Drawing Sheets

(56) References Cited

U.S. PATENT DOCUMENTS

2010/0206254 A1* 8/2010 Inata .................. F01L 13/0015
123/90.16

FOREIGN PATENT DOCUMENTS

| JP | 2010242547 A | * 10/2010 |
| JP | A-2010-275941 | 12/2010 |

* cited by examiner

FAILURE DETECTION DEVICE FOR BLOW-BY GAS RECIRCULATION APPARATUS OF ENGINE

CROSS-REFERENCE TO RELATED APPLICATIONS

This application is based upon and claims the benefit of priority from the prior Japanese Patent Application No. 2013-166352 filed on Aug. 9, 2013, the entire contents of which are incorporated herein by reference.

BACKGROUND OF THE INVENTION

1. Field of the Invention

The present invention relates to a blow-by gas recirculation apparatus to allow blow-by gas generated in an engine to flow in an intake passage to return to the engine, and more particularly to a failure detection device configured to detect a failure of the recirculation apparatus.

2. Related Art

Conventionally, as a technique of the above type, there is known a blow-by gas recirculation apparatus disclosed for example in JP-A-10-184336 (1998). This recirculation apparatus is provided with a blow-by gas recirculation passage provided between a crank case (or a cylinder head cover) of an engine and an intake passage downstream of a throttle valve and a PCV valve provided in the recirculation passage to operate in response to negative pressure. The PCV valve is arranged to adjust its opening degree by a differential pressure between the pressure exerted on an inlet side of the PCV valve and the pressure exerted on an outlet side to thereby regulate a gas flow rate in the blow-by gas recirculation passage. Herein, when a negative pressure is generated in the intake passage during operation of the engine, blow-by gas containing unburned fuel components is caused to flow in the intake passage through the PCV valve and the blow-by gas recirculation passage and thus return to a combustion chamber of the engine. By this recirculation, the blow-by gas can be supplied and treated together with fuel without leaking to atmosphere.

Further, JP-A-10-184336 discloses a failure detection device for the blow-by gas recirculation apparatus. This failure detection device is provided with a gas pressure sensor to detect gas pressure in a blow-by gas recirculation passage and an electronic control device (ECU) to make a determination based on the pressure detected by the gas pressure sensor as to whether or not the blow-by gas recirculation passage is failed.

SUMMARY OF INVENTION

Problems to be Solved by the Invention

In the failure detection device disclosed in JP-A-10-184336, however, a dedicated gas pressure sensor to detect the pressure of blow-by gas is provided in the blow-by gas recirculation passage and hence the number of components of the device is increased by just the gas pressure sensor, resulting in an increase in size and cost of the device. The above failure detection device can detect gas leakage and gas clogging in the blow-by gas recirculation passage, but it cannot detect a failure of the PCV valve. In order to detect such a failure of the PCV valve, it is conceivable to additionally provide a cutoff valve in the blow-by gas recirculation passage and control this cutoff valve to open and close. However, in a case where the cutoff valve is added, the number of components of the device is further increased due to this cutoff valve. This may further increase the size and the cost of the device.

The present invention has been made in view of the circumstances and has a purpose to provide a failure detection device for a blow-by gas recirculation apparatus of an engine to enable effectively detecting a failure of a PCV valve without increasing the number of dedicated components for failure detection and without increasing size and cost.

Means of Solving the Problems

To achieve the above purpose, one aspect of the invention provides a failure detection device for a blow-by gas recirculation apparatus of an engine, wherein the engine including a combustion chamber, an intake passage, an exhaust passage, a fuel supply unit to supply fuel to the combustion chamber, and an intake regulating valve to regulate an intake amount flowing in the intake passage, the engine is provided with an intake pressure changing unit to change intake pressure in the intake passage downstream of the intake regulating valve and an intake amount detecting unit to detect intake amount flowing in the intake passage upstream of the intake regulating valve to detect an operating condition of the engine, the blow-by gas recirculation apparatus includes a blow-by gas recirculation passage to allow blow-by gas generated in the engine to flow in the intake passage to return to the engine, and a PCV valve configured to be operated in response to negative pressure to regulate a flow rate of blow-by gas in the blow-by gas recirculation passage, the blow-by gas recirculation passage having an outlet connected to the intake passage downstream of the intake regulating valve, and the failure detection device further includes a failure determining unit configured such that, during deceleration operation of the engine and when fuel supply by the fuel supply unit is cut off, the failure determining unit holds the intake regulating valve at a predetermined slight opening degree, controls the intake pressure changing to change intake pressure in the intake passage downstream of the intake regulating valve, and determines whether or not the PCV valve is failed based on changes in the intake amount detected by the intake amount detecting unit before and after the intake pressure changes.

Advantageous Effects of Invention

According to the present invention, it is possible to effectively detect a failure of a PCV valve without increasing the number of dedicated components for failure detection and without increasing size and cost.

DESCRIPTION OF EMBODIMENTS

First Embodiment

A detailed description of a first embodiment embodying a failure detection device for a blow-by gas recirculation apparatus of an engine according to the present invention will now be given referring to the accompanying drawings.

Figure 1:
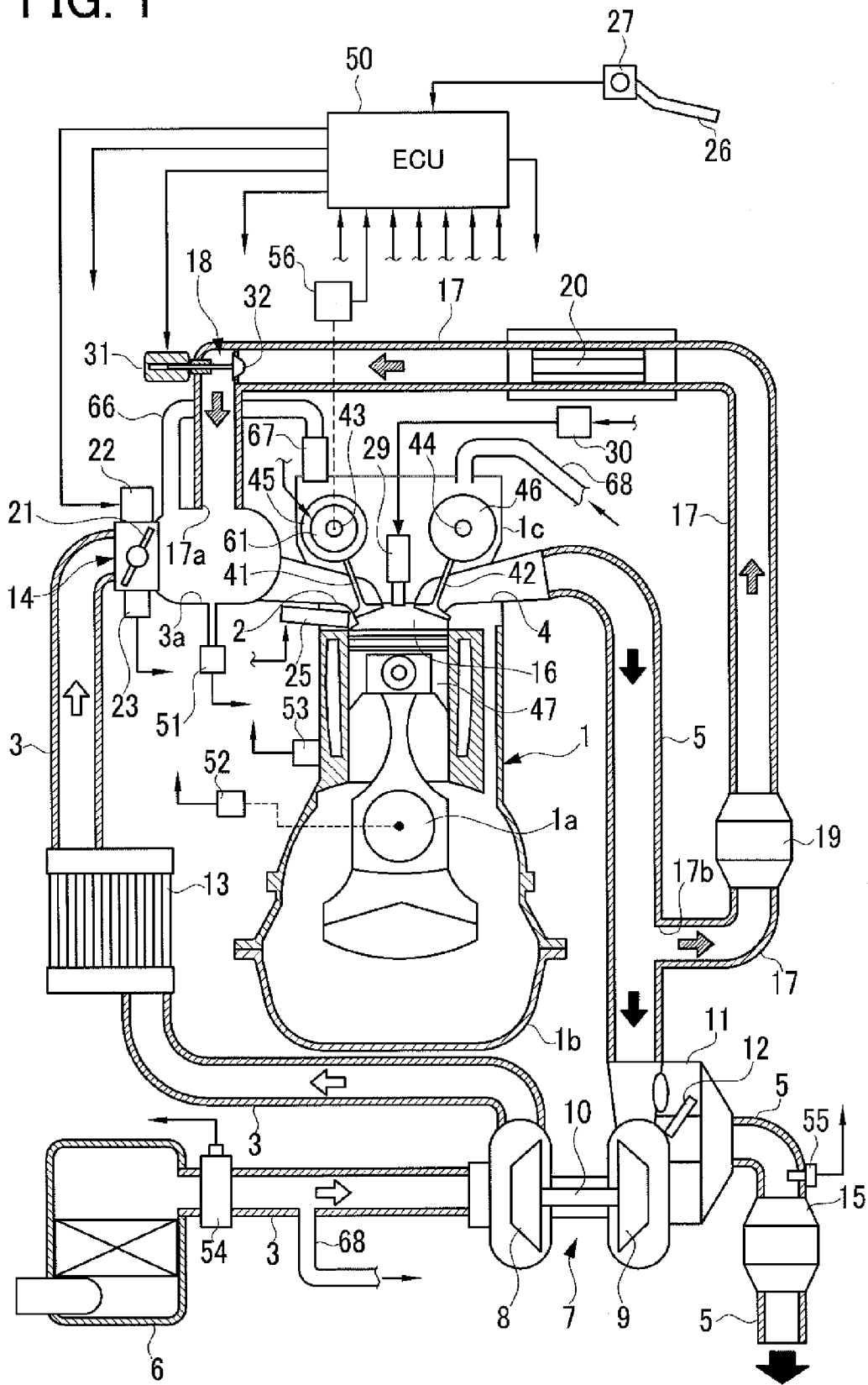
FIG. 1 is a schematic configuration view showing a gasoline engine system including a supercharger and an EGR apparatus in a first embodiment.

FIG. 1 is a schematic configuration view of a gasoline engine system including a supercharger and an exhaust gas recirculation (EGR) apparatus in the present embodiment. This engine system to be mounted in a car includes a reciprocating-type engine 1. This engine 1 has an intake port 2 connected to an intake passage 3 and an exhaust port 4 connected to an exhaust passage 5. An air cleaner 6 is provided at an inlet of the intake passage 3. In the intake passage 3 downstream of the air cleaner 6, a supercharger 7 is placed in a position between a portion of the intake passage 3 and a portion of the exhaust passage 5 to increase the pressure of intake air in the intake passage 3.

The supercharger 7 includes a compressor 8 placed in the intake passage 3, a turbine 9 placed in the exhaust passage 5, and a rotary shaft 10 connecting the compressor 8 and the turbine 9 so that they are integrally rotatable. The supercharger 7 is configured to rotate the turbine 9 with exhaust gas flowing in the exhaust passage 5 and integrally rotate the compressor 8 through the rotary shaft 10 in order to increase the pressure of intake air in the intake passage 3, that is, carry out supercharging.

In the exhaust passage 5, adjacent to the supercharger 7, an exhaust bypass passage 11 is provided by detouring around the turbine 9. In this exhaust bypass passage 11, a waste gate valve 12 is placed. This waste gate valve 12 regulates exhaust gas allowed to flow in the exhaust bypass passage 11. Thus, a flow rate of exhaust gas to be supplied to the turbine 9 is regulated, thereby controlling the rotary speeds of the turbine 9 and the compressor 8, and adjusting supercharging pressure of the supercharger 7.

In the intake passage 3, an intercooler 13 is provided between the compressor 8 of the supercharger 7 and the engine 1. This intercooler 13 serves to cool intake air having the pressure increased by the compressor 8 and hence a high temperature, down to an appropriate temperature. A surge tank 3a is provided in the intake passage 3 between the intercooler 13 and the engine 1. Further, an electronic throttle device 14 that is an electrically-operated throttle valve is placed downstream of the intercooler 13 but upstream of the surge tank 3a. This throttle device 14 corresponding to one example of an intake regulating valve of the invention includes a butterfly-shaped throttle valve 21 placed in the intake passage 3, a step motor 22 to drive the throttle valve 21 to open and close, and a throttle sensor 23 to detect an opening degree or position (a throttle opening degree) TA of the throttle valve 21. The throttle device 14 is configured so that the throttle valve 21 is driven by the step motor 22 to open and close according to operation of an accelerator pedal 26 by a driver to adjust the opening degree of the throttle valve 21. The configuration of this throttle device 14 can be provided by for example a basic configuration of a "throttle device" disclosed in JP-A-2011-252482, FIGS. 1 and 2. In the exhaust passage 5 downstream of the turbine 9, a catalytic converter 15 is provided as an exhaust catalyst to clean exhaust gas.

The engine 1 is further provided with an injector(s) 25 to inject and supply fuel into a combustion chamber(s) 16. The injector 25 is configured to be supplied with the fuel from a fuel tank (not shown). The injector 25 corresponds to one example of a fuel supply unit of the invention. The engine 1 is further provided with an ignition plug 29 in each cylinder. Each of the ignition plugs 29 ignites in response to high voltage output from an igniter 30. An ignition timing of each ignition plug 29 is determined by output timing of the high voltage from the igniter 30.

In the present embodiment, the EGR apparatus to enable high EGR rates is a high pressure loop system and includes an exhaust gas recirculation (EGR) passage 17 allowing part of exhaust gas discharged from the combustion chamber 16 of the engine 1 to the exhaust passage 5 to flow in the intake passage 3 and return to the combustion chamber 16, and an exhaust gas recirculation (EGR) valve 18 placed in the EGR passage 17 to regulate an exhaust gas flow rate (EGR flow rate) in the EGR passage 17. The EGR passage 17 is provided to extend between the exhaust passage 5 upstream of the turbine 9 and the surge tank 3a. Specifically, an outlet 17a of the EGR passage 17 is connected to the intake passage 3 downstream of the throttle valve 21 in order to allow a part of exhaust gas flowing in the exhaust passage 5 to flow as EGR gas into the intake passage 3 and return to the combustion chamber 16. An inlet 17b of the EGR passage 17 is connected to the exhaust passage 5 upstream of the catalytic converter 15.

In the vicinity of the inlet 17b of the EGR passage 17, a catalytic converter 19 for EGR is provided to clean EGR gas. In the EGR passage 17 downstream of the catalytic converter 19, furthermore, an EGR cooler 20 is provided to cool EGR gas flowing in the EGR passage 17. In the present embodiment, the EGR valve 18 is located in the EGR passage 17 downstream of the EGR cooler 20.

Figure 2:
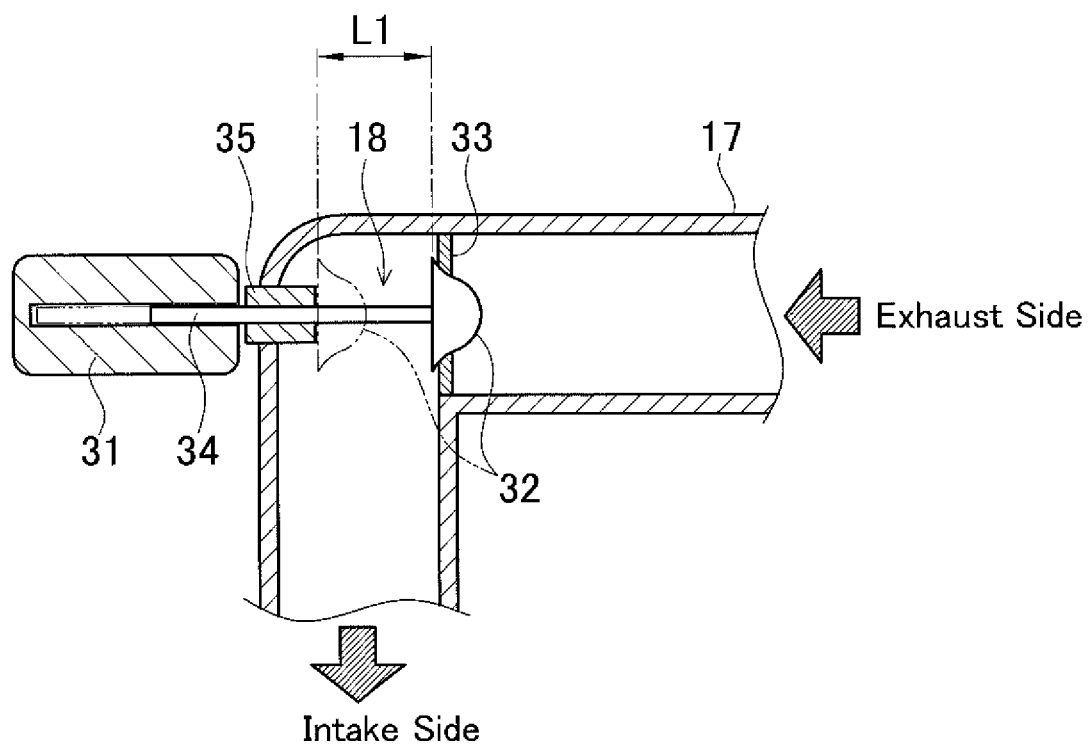
FIG. 2 is an enlarged cross sectional view of a part of an EGR passage, in which an EGR valve is provided, in the first embodiment.

FIG. 2 is an enlarged cross sectional view of a part of the EGR passage 17, in which the EGR valve 18 is provided. As shown in FIGS. 1 and 2, the EGR valve 18 is configured as a poppet valve and a motor-operated valve. Specifically, the EGR valve 18 is provided with a valve element 32 to be driven by a DC motor 31. The valve element 32 has an almost conical shape and is configured to seat on a valve seat 33 provided in the EGR passage 17. The DC motor 31 includes an output shaft 34 arranged to reciprocate in a straight line (stroke movement). The valve element 32 is fixed at a leading end of the output shaft 34. This output shaft 34 is supported in a housing defining the EGR passage 17 through a bearing 35. The stroke movement of the output shaft 34 of the DC motor 31 is performed to adjust the opening degree of the valve element 32 with respect to the valve seat 33. The output shaft 34 of the EGR valve 18 is provided to be able to make stroke movement by a predetermined stroke L1 between a fully closed position in which the valve element 32 seats on the valve seat 33 and a fully opened position in which the valve element 32 contacts with the bearing 35. In the present embodiment, an opening area of the valve seat 33 is set larger than a conventional one in order to achieve high EGR rates. Accordingly, the valve element 32 is also designed with large size. As the structure of this EGR valve 18, for example, a basic structure of an "EGR valve" disclosed in FIG. 1 of JP-A-2010-275941 can be adopted.

In the present embodiment, the EGR valve 18 corresponds to one example of an intake pressure changing unit of the invention. Specifically, the EGR valve 18 is opened and closed during deceleration operation of the engine 1 to thereby change the intake pressure PM in the intake passage 3 downstream of the throttle valve 21, i.e., in the surge tank 3a.

As shown in FIG. 1, a cylinder head 1c of the engine 1 is provided with an intake valve 41 to open and close the intake port 2 and an exhaust valve 42 to open and close the exhaust port 4, respectively. The intake valve 41 and the exhaust valve 42 are configured to be operated respectively by rotation of different cam shafts 43 and 44. The cam shafts 43 and 44 are respectively provided, at their leading ends, with different timing pulleys 45 and 46. Each of the timing pulleys 45 and 46 is drivingly coupled to the crank shaft 1a through a timing belt or the like (not shown). During operation of the engine 1, the rotational force of the crank shaft 1a is transmitted to each of the cam shafts 43 and 44 through the timing belts and others and the corresponding timing pulleys 45 and 46. This operates the intake valve 41 to open and close the intake port 2 and operates the exhaust valve 42 to open and close the exhaust port 4. At that time, the intake valve 41 and the exhaust valve 42 are operable at predetermined timings in sync with rotation of the crank shaft 1a, that is, in sync with intake stroke, combustion stroke, combustion and expansion stroke, and exhaust stroke in accordance with up and down movements of a piston 47 connected to the crank shaft 1a. In the present embodiment, the cam shafts 43 and 44 and the timing pulleys 45 and 46 constitute a valve moving mechanism.

In the present embodiment, the cam shaft 43 on an intake side is provided with a cam angle sensor 56 as shown in FIG. 1. This cam angle sensor 56 is arranged to detect a rotation angle of the cam shaft 43. The timing pulley 45 on the intake side is provided with an electrically-operated variable valve timing mechanism (hereinafter, simply referred to as "VVT") 61. This VVT 61 is configured to change opening and closing timings (valve timings) which are opening and closing characteristics of the intake valve 41. Specifically, the VVT 61 is driven by a motor (not shown) attached thereto to advance and retard the valve timings of the intake valve 41 in a predetermined range. This adjusts valve overlap of the intake valve 42 and the exhaust valve 42. In the present embodiment, the VVT 61 corresponds to one example of an opening and closing characteristics varying mechanism 1.

The VVT 61 includes a ring gear and a helical spline (both of which are not shown) interposed between the cam shaft 43 and the timing pulley 45 on the intake side. This VVT 61 is driven by the motor to rotate and slide the ring gear to change a rotation phase between the cam shaft 43 and the timing pulley 45. The structure of the VVT 61 including this type of ring gear and others is already well known and thus the details thereof are omitted herein.

Figure 3A:
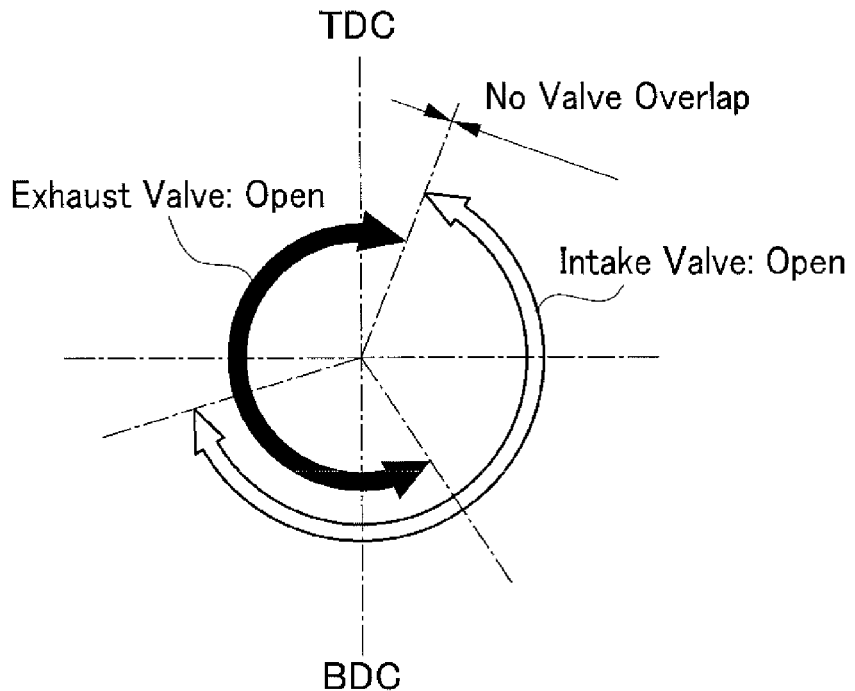
FIGS. 3A and 3B are schematic diagrams showing valve overlap of an intake valve and an exhaust valve in the first embodiment.
Figure 3B:
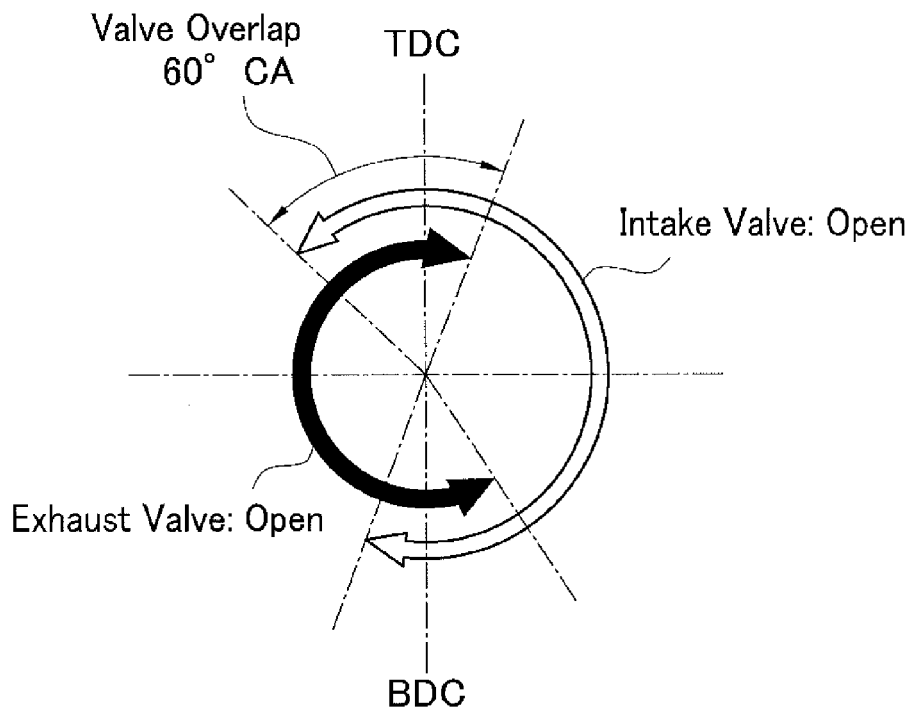

The following explanation is given to how the valve overlap of the intake valve 41 and the exhaust valve 42 is changed by the VVT 61. FIGS. 3A and 3B are schematic diagrams showing the valve overlap between the intake valve 41 and the exhaust valve 42. The valve overlap represents a state in which the intake port and the exhaust port are both open in a reciprocating-type engine. Normally, the valve overlap is set for the purpose of causing the intake valve to open the intake port just before the end of the exhaust stroke in a 4-stroke engine to improve filling efficiency of intake air. When the valve overlap is set to be wider, a substantial compression ratio of the engine decreases, thereby enabling preventing abnormal combustion such as knocking. In contrast, when the valve overlap is set to be narrower, the filling efficiency of air-fuel mixture in a low rotation region of the engine increases, thereby enabling realizing stable combustion of the air-fuel mixture even under low load and low rotation. In addition to terms of engine output, utilization of the valve overlap enables internal EGR in the engine. This also contributes to improvement of fuel efficiency such as reduction in pumping loss as well as purification of exhaust gas. Although appropriate timings for the internal EGR depend on rotation speed, load, and other conditions of the engine, the VVT can implement the valve overlap at optimal timings.

In FIG. 1, the VVT 61 is operated to advance the rotation phase of the cam shaft 43 on the intake side than that of the timing pulley 45, thereby advancing the phase of the valve timings of the intake valve 41 than the rotation phase of the crank shaft 1a. In this case, as shown in FIG. 3B, when the valve timing of the intake valve 41 is relatively advanced, the valve overlap between the intake valve 41 and the exhaust valve 42 in the intake stroke is relatively increased (e.g., a crank angle of 60° CA in the present embodiment). At that time, when the valve timing of the intake valve 41 is most advanced by the VVT 61, the valve overlap becomes maximum. In contrast, when the VVT 61 is operated to retard the rotation phase of the cam shaft 43 on the intake side than that of the timing pulley 45, the phase of the valve timing of the intake valve 41 is retarded than the rotation phase of the crank shaft 1a. In this case, as shown in FIG. 3A, the valve timing of the intake valve 41 is relatively retarded, the valve overlap in the intake stroke becomes relatively small. At that time, when the valve timing of the intake valve 41 is most retarded by the VVT 61, the valve overlap is minimized (is eliminated).

In the present embodiment, the engine 1 is provided with a blow-by gas recirculation apparatus arranged to allow blow-by gas leaking from the combustion chamber 16 into the crank case 1b and the cylinder head (including a head cover) 1c to return to the combustion chamber 16 by use of the negative pressure generated in the intake passage 3. The blow-by gas recirculation apparatus includes, as shown in FIG. 1, a blow-by gas recirculation passage 66, a PCV valve 67, and a scavenging passage 68. The blow-by gas recirculation passage 66 is arranged to allow the blow-by gas generated in the engine 1 to flow in the intake passage 3 for recirculation to the combustion chamber 16. The blow-by gas recirculation passage 66 has an inlet connected to the cylinder head 1c through the PCV valve 67 and an outlet connected to the surge tank 3a. The PCV valve 67 is configured to operate in response to negative pressure in order to regulate a flow rate of blow-by gas in the blow-by gas recirculation passage 66. Herein, during operation of the engine 1 and non-operation of the supercharger 7, the inside of the surge tank 3a becomes negative pressure, which acts on the inside of the cylinder head 1c through the blow-by gas recirculation passage 66 and the PCV valve 67. When the PCV valve 67 operates to open in response to this negative pressure, the blow-by gas is caused to flow from the cylinder head 1c to the surge tank 3a through the PCV valve 67 and the blow-by gas recirculation passage 66. The scavenging passage 68 has an inlet connected to the intake passage 3 near the air cleaner 6 and an outlet connected to the cylinder head 1c (the head cover). The scavenging passage 68 is configured to introduce fresh air into the cylinder head 1c to scavenge the inside thereof when the blow-by gas flows from the cylinder head 1c to the surge tank 3a.

Figure 4:
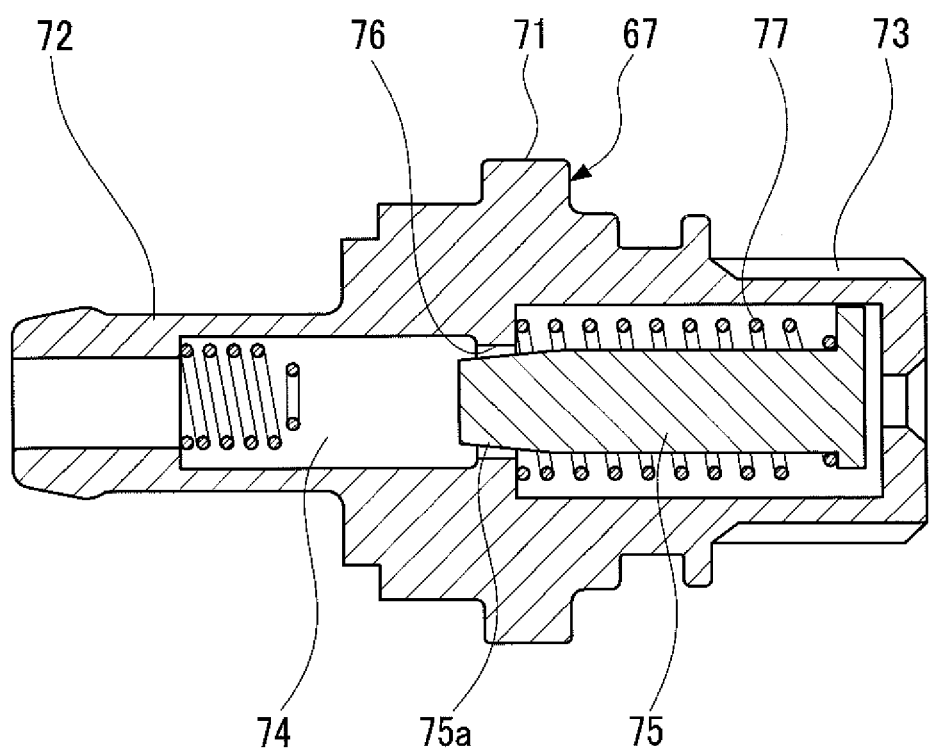
FIG. 4 is a cross sectional view showing a PCV valve in the first embodiment.

FIG. 4 is a cross sectional view of the PCV valve 67. This PCV valve 67 includes a pipe-shaped main body 71 formed with a pipe joint 72 at one end and a male screw 73 at the other end as shown in FIG. 4. The pipe joint 72 is connected to the blow-by gas recirculation passage 66 and the male screw 73 is connected to the cylinder head 1c. In a passage 74 internally formed in the main body 71, a nearly-bullet-shaped valve element 75 is placed to be able to reciprocate in an axial direction. This valve element 75 is formed, at its distal end (a left end in FIG. 4), with a tapered needle part 75a which is inserted through a hole-shaped measuring part 76 formed in the passage 74 of the main body 71. The valve element 75 is biased in a direction to widen a gap between the needle part 75a and the measuring part 76 (i.e., the opening degree of the valve element 75), that is, in a valve opening direction, by a spring 77 provided around the valve element 75. While the negative pressure generated in the surge tank 3a acts on the passage 74 of the main body 71 from the side of the pipe joint 72, the balance between the negative pressure, the internal pressure of the cylinder head 1c, and the biasing force of the spring 77 determines the movement position of the valve element 75, thereby determining the opening degree of the valve element 75. By this opening degree, a flow rate of blow-by gas to be induced from the cylinder head 1c to the surge tank 3a is regulated.

Figure 5:
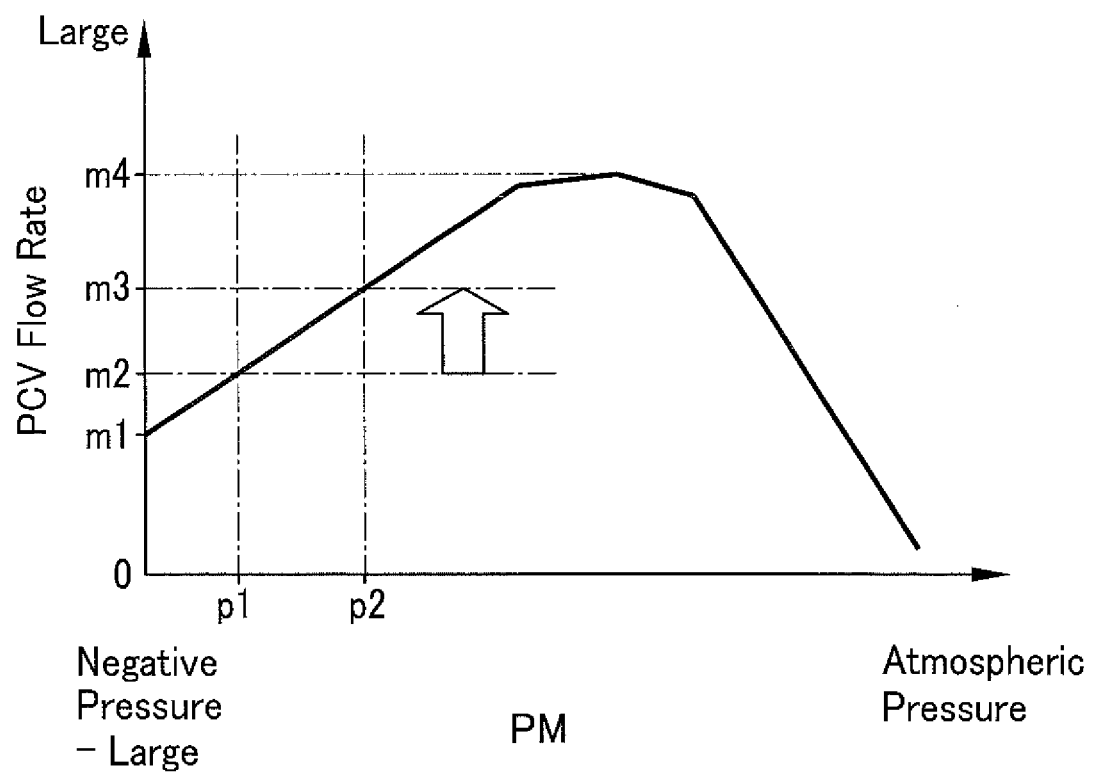
FIG. 5 is a graph showing flow characteristics of the PCV valve during deceleration fuel cutoff of an engine in the first embodiment.

FIG. 5 is a graph showing flow rate characteristics of the PCV valve 67 during deceleration fuel cutoff of the engine 1. In this graph, a lateral axis represents intake pressure PM (negative pressure) in the surge tank 3a acting on the PCV valve 67 through the blow-by gas recirculation passage 66, and a vertical axis represents a flow rate of blow-by gas flowing in the PCV valve 67 (a PCV flow rate). As is found from this graph, as the intake pressure PM increases from "Large negative pressure" toward "Atmospheric pressure", the PCV flow rate increases from a certain small flow rate m1 to a maximum flow rate m4, and then decreases toward zero. Thus, in a period until the PCV flow rate increasing from the minimum flow rate m1 reaches the maximum flow rate m4, when the EGR valve 18 is closed, the intake pressure PM becomes a first value p1 and the PCV flow rate becomes a second flow rate m2. When the EGR valve 18 is opened, the intake pressure PM becomes a second value p2 (>p1) and the PCV flow rate becomes a third value m3 (>m2). In other words, this PCV valve 67 has flow rate characteristics that the PCV flow rate increases when the EGR valve 18 is opened from a valve-closed state during deceleration fuel cutoff of the engine 1.

In the present embodiment, for respectively executing fuel injection control, ignition timing control, intake amount control, EGR control, valve timing control, and others according to the operating condition of the engine 1, an electronic control unit (ECU) 50 controls the injectors 25, the igniter 30, the step motor 22 of the electronic throttle device 14, the DC motor 31 of the EGR valve 18, and the VVT 61 according to the operating condition of the engine 1. The ECU 50 includes a central processing unit (CPU), various memories that store a predetermined control program and others in advance and that temporarily store computational results and others of the CPU, and an external input circuit and an external output circuit connected to each of them. The ECU 50 is one example of a failure determining unit of the invention. To the external output circuit, there are connected the igniter 30, the injectors 25, the step motor 22, the DC motor 31, the VVT 61, and others. To the external input circuit, there are connected the throttle sensor 23 and various sensors 27, 28, and 51-56 to detect the operating condition of the engine 1 and transmit various engine signals to the external input circuit.

In the present embodiment, the various sensors include the accelerator sensor 27, the intake pressure sensor 51, the rotation speed sensor 52, the water temperature sensor 53, the air flow meter 54, and the air-fuel ratio sensor 55 as well as the throttle sensor 23 and the cam angle sensor 56. The accelerator sensor 27 detects an accelerator opening degree ACC which is an operation amount of the accelerator pedal 26. This accelerator pedal 26 is to be operated by a driver to adjust output of the engine 1. The intake pressure sensor 51 corresponds to one example of an intake pressure detecting unit of the invention and inherently acts to detect the intake pressure PM in the surge tank 3a as one factor representing the operating condition of the engine 1. The rotation speed sensor 52 detects the rotation angle (crank angle) of the crank shaft 1a of the engine 1 and also detects changes in crank angle as the rotation speed (engine rotation speed) NE of the engine 1. The water temperature sensor 53 detects the cooling water temperature THW of the engine 1. The air flow meter 54 corresponds to one example of an intake amount detecting unit of the invention and inherently acts to detect a flow amount Ga of intake air flowing in the intake passage 3 directly downstream of the air cleaner 6 as one factor representing the operating condition of the engine 1. The air-fuel ratio sensor 55 is placed in the exhaust passage 5 directly upstream of the catalytic convertor 15 to detect an air-fuel ratio A/F in the exhaust gas.

In this embodiment, the ECU 50 is configured to control the EGR valve 18 in the whole operating region of the engine 1 to control EGR according to the operating condition of the engine 1. Further, the ECU 50 is arranged to normally control the EGR valve 18 to open based on an operating condition detected during acceleration operation or steady operation of the engine 1 and control the EGR valve 18 to close during stop of the engine 1, during idle operation, or during deceleration operation.

In the present embodiment, the ECU 50 is arranged to control the electronic throttle device 14 based on an accelerator opening degree ACC in order to drive the engine 1 in response to requests from a driver. The ECU 50 is further arranged to control the electronic throttle device 14 to open based on the accelerator opening degree ACC during acceleration operation or steady operation of the engine 1 and to control the electronic throttle device 14 to close during stop or deceleration operation of the engine 1. Accordingly, the throttle valve 21 is opened during acceleration operation or steady operation of the engine 1 and closed during stop or deceleration operation of the engine 1. Herein, during deceleration operation of the engine 1, the intake valve 21 is held in a predetermined slight open state (a sonic state), close to full close, whereby allowing a slight flow rate of intake air to flow therethrough.

Herein, the blow-by gas recirculation apparatus of the present embodiment also needs to appropriately perform blow-by gas recirculation. In the present embodiment, therefore, the ECU 50 executes the following failure detection processing.

Figure 6:
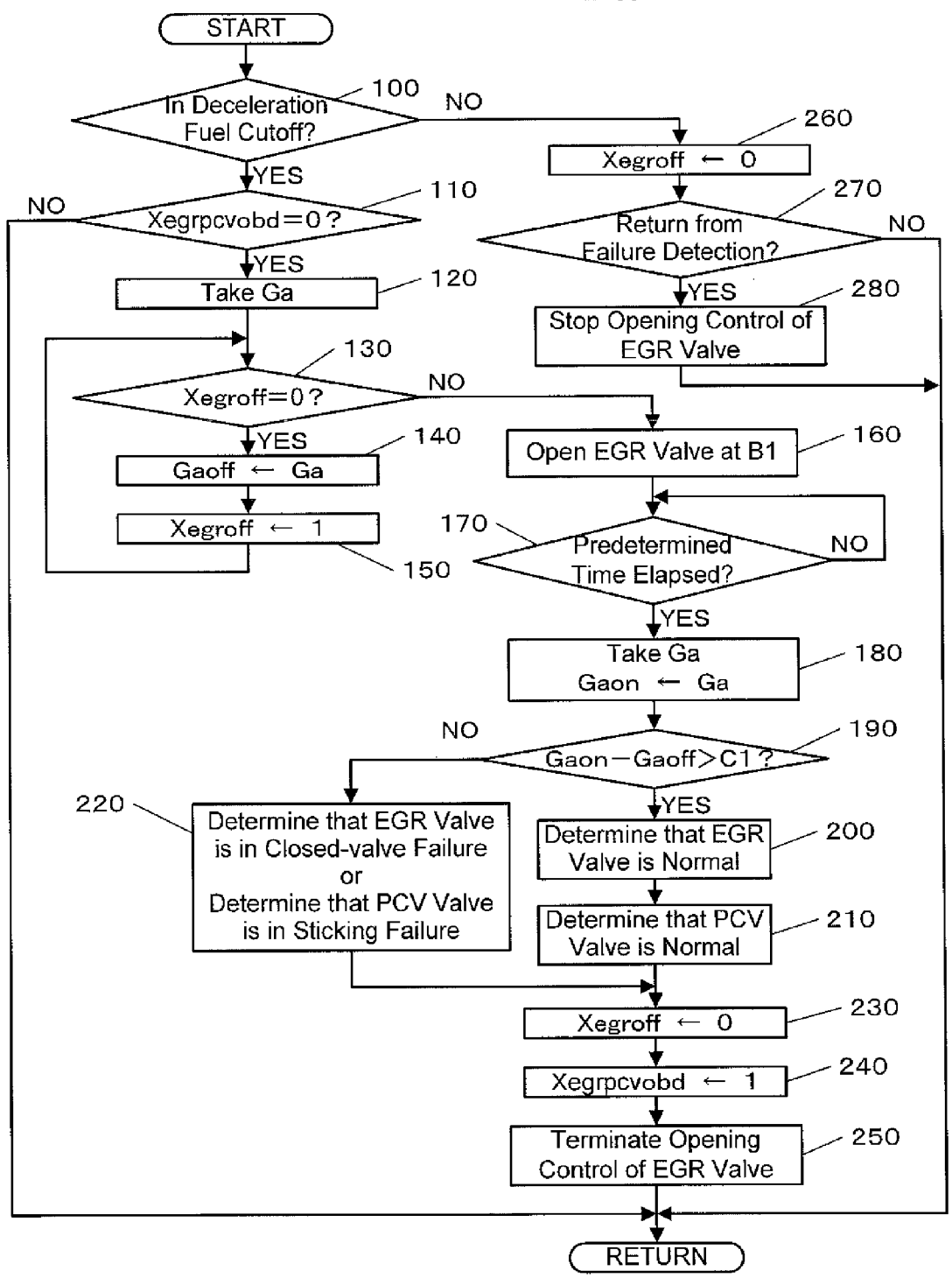
FIG. 6 is a flowchart showing one example of processing details of failure determination in the first embodiment.

FIG. 6 is a flowchart showing one example of processing details of failure detection. When the processing proceeds to this routine, in Step 100, the ECU 50 first determines whether or not the operating condition of the engine 1 is in deceleration fuel cutoff. Specifically, it is determined whether or not the engine 1 is in deceleration operation and also fuel supply by the injectors 25 to the engine 1 is cut off. This condition is referred to as "deceleration fuel cutoff". During deceleration operation of the engine 1, the throttle valve 21 of the electronic throttle device 14 and the EGR valve 18 are respectively controlled to close. At that time, the EGR valve 18 is fully closed, while the throttle valve 21 is held in a predetermined slight open state (a sonic state) whereby allowing a slight flow rate of intake air to flow therethrough. The ECU 50 can make this determination based on changes in accelerator opening degree ACC. If a negative determination (NO) is made in Step 100, the ECU 50 shifts the processing to Step 260. If a positive determination (YES) is made in Step 100, the ECU 50 advances the processing to Step 110.

In Step 110, the ECU 50 determines whether or not a failure determination flag Xegrpcvobd is "0". This flag Xegrpcvobd is set to "1" when it was determined whether or not the EGR valve 18 and the PCV valve 67 are failed (failure determination), whereas it is set to "0" when this failure determination was not performed. If NO in Step 110, the ECU 50 returns the processing to Step 100. If YES in Step 110, the ECU 50 shifts the processing to Step 120.

In Step 120, the ECU 50 takes, or reads, an intake amount Ga based on a detection value of the air flow meter 54.

In Step 130, the ECU 50 then determines whether or not an EGR-closed flag Xegroff is "0". This flag Xegroff is set to "1" when an EGR-closed intake amount Gaoff during closing of the EGR valve 18 is obtained as mentioned later, while it is set to "0" when the EGR-closed intake amount Gaoff is not obtained. If NO in Step 130, the ECU 50 shifts the processing to Step 160. If YES in Step 130, the ECU 50 advances the processing to Step 140.

In Step 140, the ECU 50 stores, in a memory, the intake amount Ga taken in Step 120 as an EGR-closed intake amount Gaoff obtained during closing of the EGR valve 18. In Step 150, the ECU 50 further sets the EGR-closed flag Xegroff to "1" and then returns the processing to Step 130.

On the other hand, in Step 160 subsequent to Step 130, the ECU 50 controls the EGR valve 18 to open by a predetermined opening degree B1. Thus, the EGR valve 18 having been fully closed once is forcibly opened.

In Step 170, successively, the ECU 50 waits for a lapse of a predetermined time and then goes to Step 180. Herein, the predetermined time can be set to for example "1 second".

In Step 180, the ECU 50 takes the intake amount Ga based on a detection value of the air flow meter 54 and stores, in the memory, the taken intake amount Ga as an EGR-open intake amount Gaon obtained during opening of the EGR valve 18.

In Step 190, the ECU 50 determines whether or not a difference between the EGR-open intake amount Gaon and the EGR-closed intake amount Gaoff is larger than a predetermined value C1. Specifically, the ECU 50 determines whether or not a different between the intake amount Ga during opening of the EGR valve 18 and the intake amount Ga during closing of the EGR valve 18 is large to a certain degree. If YES in Step 190, the ECU 50 shifts the processing to Step 200. If NO in Step 1 190, the ECU 50 shifts the processing to Step 220.

In Step 200, the ECU 50 determines that the EGR valve 18 is normal, that is, the EGR valve 18 is functioning normally. Herein, the ECU 50 can store this fact that the EGR valve 18 is normal in the memory.

In Step 210, the ECU 50 determines that the PCV valve 67 is normal and then shifts the processing to 230. Herein, the ECU 50 can store this fact that the PCV valve 67 is normal in the memory.

On the other hand, in Step 220, the ECU 50 determines that the EGR valve 18 is failed, that is, the EGR valve 18 is malfunctioning, in a valve-closed state (closed-valve failure) or that the PCV valve 67 is failed by sticking (sticking failure) and shifts the processing to Step 230. Herein, the ECU 50 can inform a driver of the fact the EGR valve 18 is determined to be in the closed-valve failure or that the PCV vale 67 is determined to be in the sticking failure, and stores this fact in the memory.

In Step 230, the ECU 50 resets the EGR-closed flag Xegroff to "0". In Step 240, the ECU 50 further sets the failure determination flag Xegrpcvobd to "1".

In Step 250, the ECU 50 successively terminates the valve opening control of the EGR valve 18 and returns the processing to Step 100.

On the other hand, in Step 260 subsequent to Step 100, the ECU 50 resets the EGR-closed flag Xegroff to "0".

In Step 270, the ECU 50 then determines whether or not the routine returns from the failure detection of the PCV valve 67 or the EGR valve 18. If NO in Step 270, the ECU 50 returns the processing to Step 100. If YES in Step 270, the ECU 50 shifts the processing to Step 280.

In Step 280, the ECU 50 stops or interrupts the valve opening control of the EGR valve 18 and returns the processing to Step 100.

According to the above control, during deceleration fuel cutoff of the engine 1, the ECU 50 holds the throttle valve 21 of the electronic throttle device 14 at a predetermined slight opening degree, forcibly opens the EGR valve 18 from the valve-closed state, thereby changing the intake pressure PM (negative pressure) in the surge tank 3a, and determines whether or not the PCV valve 67 is failed by sticking or the EGR valve 18 is failed in a closed state based on changes in intake amount Ga detected by the air flow meter 54 before and after the negative pressure changes.

According to the failure detection device of the present embodiment, as explained above, during deceleration fuel cutoff of the engine 1, the intake pressure PM in the surge tank 3a becomes a negative pressure. In the case of the PCV valve 67 being normal, therefore, the PCV valve 67 operates in response to the negative pressure, thereby regulating a blow-by gas flow rate in the blow-by gas recirculation passage 66 according to the magnitude of the negative pressure, and thus the intake amount PM in the surge tank 3a changes according to the blow-by gas flow rate. In the case of the PCV valve 67 being failed, on the other hand, even when the negative pressure in the surge tank 3a changes, the blow-by gas flow rate does not change as expected. Thus, the intake amount Ga in the intake passage 3 does not change as expected.

Herein, during deceleration fuel cutoff of the engine 1, the ECU 50 holds the throttle valve 21 of the electronic throttle device 14 at a predetermined slight opening degree, and forcibly opens the EGR valve 18 from the valve-closed state, so that the intake pressure PM (negative pressure) in the surge tank 3a changes. Based on changes in intake amount Ga detected by the air flow meter 54 before and after changing of the negative pressure, the ECU 50 determines whether or not the PCV valve 67 is failed by sticking. In the presence of changes in intake amount Ga, specifically, it represents that the PCV valve 67 operates as expected according to the changes in negative pressure, and the PCV valve 67 can be determined to be normal. In the absence of changes in intake amount Ga, on the other hand, it represents that the PCV valve 67 fails to operate as expected according to the changes in negative pressure and the PCV valve 67 can be determined to be failed by sticking. In the present embodiment, the air flow meter 54 to detect the intake amount Ga representing the operating condition of the engine 1 is also used to judge sticking failure of the PCV valve 67 and thus add any dedicated sensor for failure detection does not need to be added. Since the EGR valve 18 provided in the engine 1 to regulate the EGR gas flow rate is also used as a means for changing intake pressure PM, any dedicated device thereof does not need to be added. This makes it possible to effectively detect sticking failure of the PCV valve 67 without increasing the number of dedicated components for failure detection and without increasing size and cost of the device.

Second Embodiment

A second embodiment embodying a failure detection device for a blow-by gas recirculation apparatus of an engine according to the present invention will be explained in detail below referring to the accompanying drawings.

In each of the following embodiments, similar or identical components to those in the first embodiment are assigned the same reference signs as those in the first embodiment and their detailed explanation is omitted. The following explanation is thus given with a focus on differences from the first embodiment.

Figure 7:
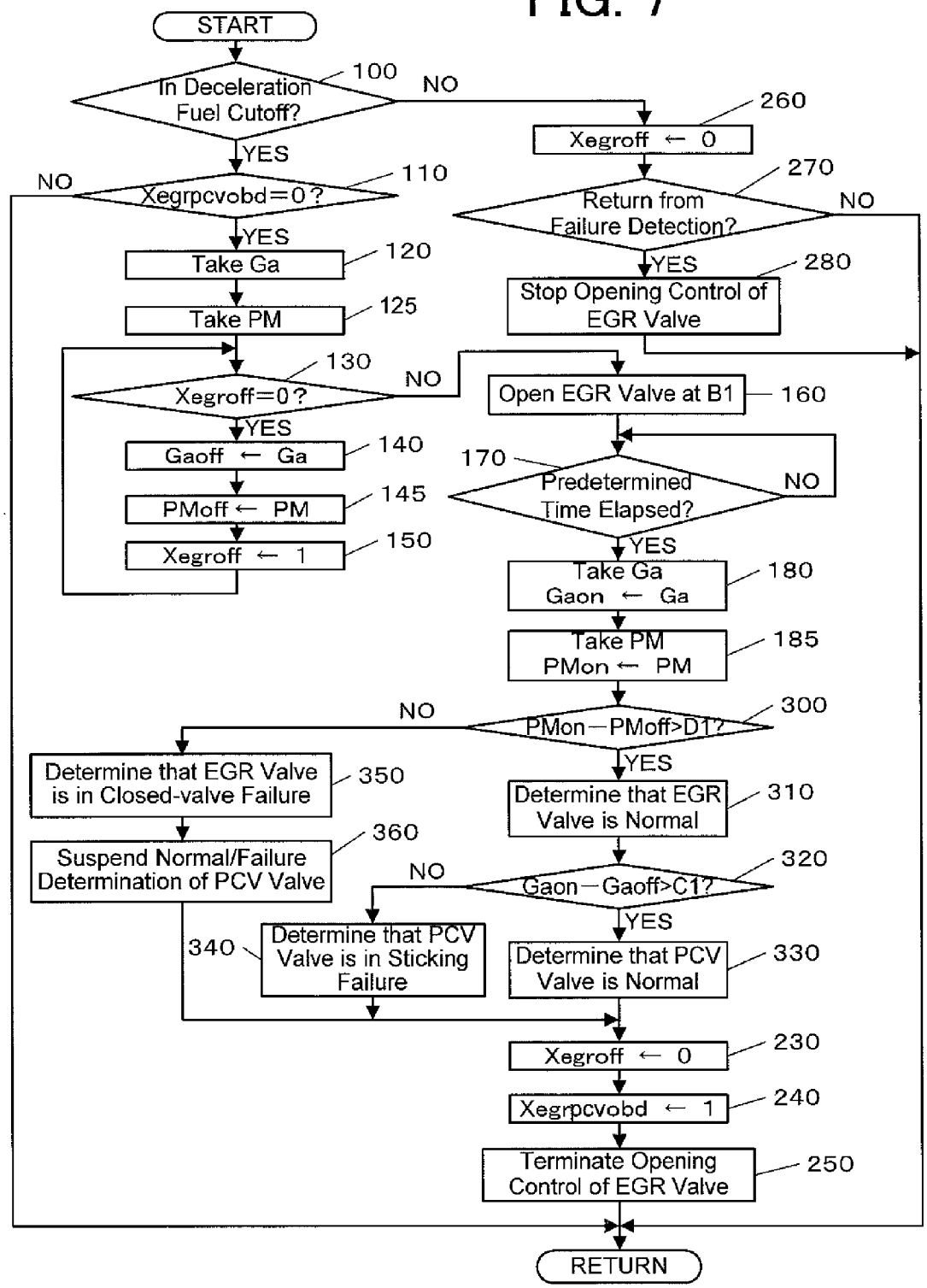
FIG. 7 is a flowchart showing one example of processing details of failure determination in a second embodiment.

The second embodiment differs from the first embodiment in the processing details for failure detection. FIG. 7 is a flowchart showing one example of the processing details for failure detection in the second embodiment. The flowchart in FIG. 7 is different from the flowchart in FIG. 6 in the processing in Step 125 added between Steps 120 and 130 of the flowchart in FIG. 6, the processing in Step 145 added between Steps 140 and 150, the processing in Step 185 added between Steps 180 and 230, and the processings in Steps 300 to 360 additionally provided.

Specifically, when the processing proceeds to this routine, the ECU 50 executes the processings in Steps 100 to 120 and then, in Step 125, takes intake pressure PM based on a detection value of the intake pressure sensor 51.

Subsequently, the ECU 50 executes the processings in Steps 130 and 140 and then stores, in Step 145, the currently taken intake pressure PM as an EGR-closed intake pressure PMoff during closing of the EGR valve 18 in the memory.

The ECU 50 then executes the processings in Steps 150 to 180 and thereafter, in Step 185, takes intake pressure PM based on a detection value of the intake pressure sensor 51 and stores the taken intake pressure PM as an EGR-open intake pressure PMon during opening of the EGR valve 18 in the memory.

In Step 300, the ECU 50 determines whether or not a difference between the EGR-open intake pressure PMon and the EGR-closed intake pressure PMoff is larger than a predetermined value D1. Specifically, the ECU 50 determines whether or not a difference between the intake pressure PM during opening of the EGR valve 18 and the intake pressure PM during closing of the EGR valve 18 is large to a certain degree. If YES in Step 300, the ECU 500 advances the processing to Step 310. If NO in Step 300, the ECU 500 shifts the processing to Step 350.

In Step 310, the ECU 50 determines that the EGR valve 18 is normal. Herein, the ECU 50 can store, in the memory, this fact that the EGR valve 18 is normal.

In Step 320, subsequently, the ECU 50 determines whether or not a difference between the EGR-open intake amount Gaon and the EGR-closed intake amount Gaoff is larger than a predetermined value C1. Specifically, the ECU 50 determines whether or not a difference between the intake amount Ga during opening of the EGR valve 18 and the intake amount Ga during closing of the EGR valve 18 is larger to a certain degree. If YES in Step 320, the ECU 50 shifts the processing to Step 330. If NO in Step 320, the ECU 50 shifts the processing to Step 340.

In Step 330, the ECU 50 determines that the PCV valve 67 is normal and shifts the processing to Step 230. At that time, the ECU 50 can store, in the memory, this fact that the PCV valve 67 is normal.

In Step 340, the ECU 50 determines that the PCV valve 67 is failed by sticking and shifts the processing to Step 230. At that time, the ECU 50 can inform a driver of the fact that the PCV valve 67 is determined to be in the sticking failure, and store this fact in the memory.

On the other hand, in Step 350 subsequent to Step 300, the ECU 50 determines that the EGR valve 18 is failed in a closed state. At that time, the ECU 50 can inform a driver of the fact that the EGR valve 18 is determined to be in the closed-valve failure, and stores this fact in the memory.

In Step 360, the ECU 50 suspends the determination to judge whether the PCV valve 67 is normal or failed (normal/failure determination), and shifts the processing to Step 230.

According to the above control, during deceleration fuel cutoff of the engine 1, the ECU 50 holds the throttle valve 21 at the predetermined slight opening degree, forcibly opens the EGR valve 18 from the valve-closed state, thereby changing the intake pressure PM (negative pressure) in the surge tank 3a, and determines whether or not the EGR valve 18 is failed in a closed state based on changes in intake pressure PM detected by the intake pressure sensor 51 before and after changing of the intake pressure PM. When determines that the EGR valve 18 is normal, the ECU 50 further determines whether or not the PCV valve 67 is failed by sticking based on changes in intake amount Ga detected by the air flow meter 54 before and after changing of the intake pressure PM (negative pressure) in the surge tank 3a.

According to the failure detection device of the present embodiment, as explained above, a determination whether or not the EGR valve 18 is failed in a closed state is made as a precondition to judge sticking failure of the PCV valve 67. Thus, the closed-valve failure of the EGR valve 18 can also be detected. When the EGR valve 18 is normal, the EGR valve 18 is forcibly opened from a valve-closed state, and accordingly the intake pressure PM in the surge tank 3a changes as expected. Herein, when the ECU 50 determines that the EGR valve 18 is normal, the ECU 50 further determines whether or not the PCV valve 67 is failed by sticking based on changes in intake amount Ga detected by the air flow meter 54 before and after the intake pressure PM (negative pressure) changes. Accordingly, sticking failure of the PCV valve 67 is judged on the precondition that the EGR valve 18 is normal, that is, on the precondition that the intake pressure PM changes as expected. Thus, that failure can be appropriately judged. This can achieve appropriate failure detection of the PCV valve 67 as well as the advantageous effects in the first embodiment.

Third Embodiment

A third embodiment embodying a failure detection device for a blow-by gas recirculation apparatus of an engine according to the invention will be explained below referring to the accompanying drawings.

In the third embodiment, the VVT 61 corresponds to one example of another intake pressure changing unit of the invention. Specifically, the VVT 61 is operated to increase the valve overlap between the intake valve 41 and the exhaust valve 42, thereby changing the intake pressure PM in the surge tank 3a.

Figure 8:
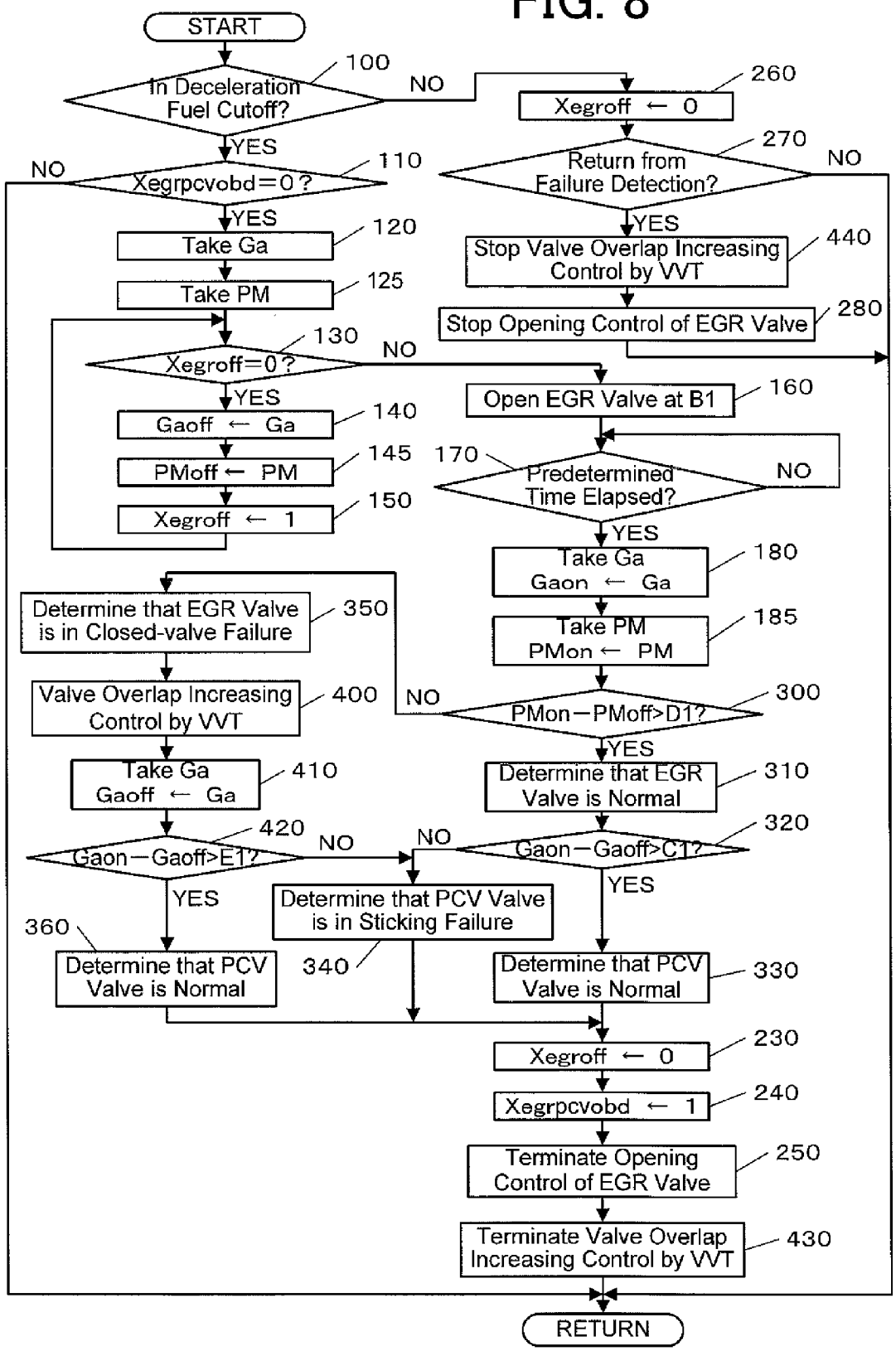
FIG. 8 is a flowchart showing one example of processing details of failure determination in a third embodiment.

The third embodiment further differs from the second embodiment in the processing details for failure detection. FIG. 8 is a flowchart showing one example of the processing details for failure detection in the third embodiment. The flowchart in FIG. 8 is different from the flowchart in FIG. 7 in the processings in Steps 400 to 420 added between Steps 350 and 330 in the flowchart in FIG. 7, the processing in Step 430 added after Step 250, and the processing in Step 440 added between Steps 270 and 280.

In this routine, specifically, the ECU 50 executes the processing in Step 350 and then, in Step 400, controls the VVT 61 to increase the valve overlap ("valve overlap increasing control"). In other words, the ECU 50 controls the VVT 61 to advance the valve timing of the intake valve 41 than a standard timing to increase the valve overlap between the valve timing of the intake valve 41 and the valve timing of the exhaust valve 42. This control reduces the magnitude of the intake pressure PM (negative pressure) in the surge tank 3*a*.

In Step 410, the ECU 50 takes the intake amount Ga based on a detection value of the air flow meter 54 and stores the taken intake amount Ga as an EGR-closed intake amount Gaoff during closing of the EGR valve 18 in the memory.

In Step 420, the ECU 50 determines whether or not a difference between the EGR-open intake amount Gaon and the EGR-closed intake amount Gaoff is larger than a predetermined value E1. Specifically, the ECU 50 determines whether or not a difference between the intake amount Ga during opening of the EGR valve 18 and the intake amount Ga during closing of the EGR valve 18 is large to a certain degree. If YES in Step 420, the ECU 50 shifts the processing to Step 360. If NO in Step 420, the ECU 50 shifts the processing to Step 340.

In Step 430 subsequent to Step 250, the ECU 50 terminates the valve overlap increasing control by the VVT 61 and returns the processing to Step 100.

On the other hand, in Step 440 subsequent to Step 270, the ECU 50 stops the valve overlap increasing control by the VVT 61 and shifts the processing to Step 280.

According to the above control, during deceleration fuel cutoff of the engine 1, the ECU 50 holds the throttle valve 21 at the predetermined slight opening degree, forcibly opens the EGR valve 18 from the valve-closed state, thereby changing the intake pressure PM (negative pressure) in the surge tank 3*a*, and determines whether or not the EGR valve 18 is failed in a closed state based on changes in intake pressure PM detected by the intake pressure sensor 51 before and after changing of the negative pressure. When determines that the EGR valve 18 is normal, the ECU 50 further determines whether or not the PCV valve 67 is failed by sticking based on changes in intake amount Ga detected by the air flow meter 54 before and after the negative pressure in the surge tank 3*a* changes. Furthermore, when the EGR valve 18 is determined to be in closed-valve failure, the ECU 50 controls the VVT 61 to change the intake pressure PM (negative pressure) in the surge tank 3*a*, and determines whether or not the PCV valve 67 is failed by sticking based on changes in intake amount Ga detected by the air flow meter 54 before and after the intake pressure changes.

According to the failure detection device of the present embodiment, as explained above, a determination whether or not the EGR valve 18 is failed in a closed state is made as a precondition to judge sticking failure of the PCV valve 67. Thus, the closed-valve failure of the EGR valve 18 can also be detected. When the EGR valve 18 is normal, the EGR valve 18 is forcibly opened from a valve-closed state, so that the intake pressure PM (negative pressure) in the surge tank 3*a* changes as expected. Herein, when the ECU 50 determines that the EGR valve 18 is normal, the ECU 50 further determines whether or not the PCV valve 67 is failed by sticking based on changes in intake amount Ga detected by the air flow meter 54 before and after the intake pressure PM (negative pressure) changes. Accordingly, the sticking failure of the PCV valve 67 is judged on the precondition that the EGR valve 18 is normal, that is, on the precondition that the intake pressure PM changes as expected. Thus, that failure can be appropriately judged. This can achieve appropriate failure detection of the PCV valve 67 as well as the advantageous effects in the first embodiment.

On the other hand, in the case where the EGR valve 18 is failed in a valve-closed state, even when the EGR valve 18 is forcibly opened from the valve-closed state, the intake pressure PM (negative pressure) in the surge tank 3*a* does not change as expected. Herein, when the EGR valve 18 is determined to be failed in a valve-closed state, the ECU 50 controls the VVT 61 to increase the valve overlap to change the intake pressure PM (negative pressure) in the surge tank 3*a*, and determines whether or not the PCV valve 67 is failed by sticking based on changes in intake amount Ga detected by the air flow meter 54 before and after the intake pressure changes. Even if the EGR valve 18 is in closed-valve failure, therefore, an occasion or step of judging the presence/absence of failure of the PCV valve 67 can be established. Since the VVT 61 provided to change the valve timing of the intake valve 41 is also used as another unit or means to change the intake pressure PM, any additional dedicated device needs to be provided. Thus, it is possible to effectively detect sticking failure of the PCV valve 67 without adding any dedicated components for failure detection and without increasing size and cost, and also to appropriately perform failure detection. The closed-valve failure of the EGR valve 18 can also be detected and the failure detection of the PCV valve 67 can be more appropriately made even when the EGR valve 18 is failed in the closed state.

Fourth Embodiment

A fourth embodiment embodying a failure detection device for a blow-by gas recirculation apparatus of an engine according to the invention will be explained below referring to the accompanying drawings.

In the fourth embodiment, the VVT 61 corresponds to one example of the intake pressure changing unit of the invention. Specifically, the VVT 61 is operated to change the valve overlap between the intake valve 41 and the exhaust valve 42, thereby changing the intake pressure PM in the surge tank 3*a*.

Figure 9:
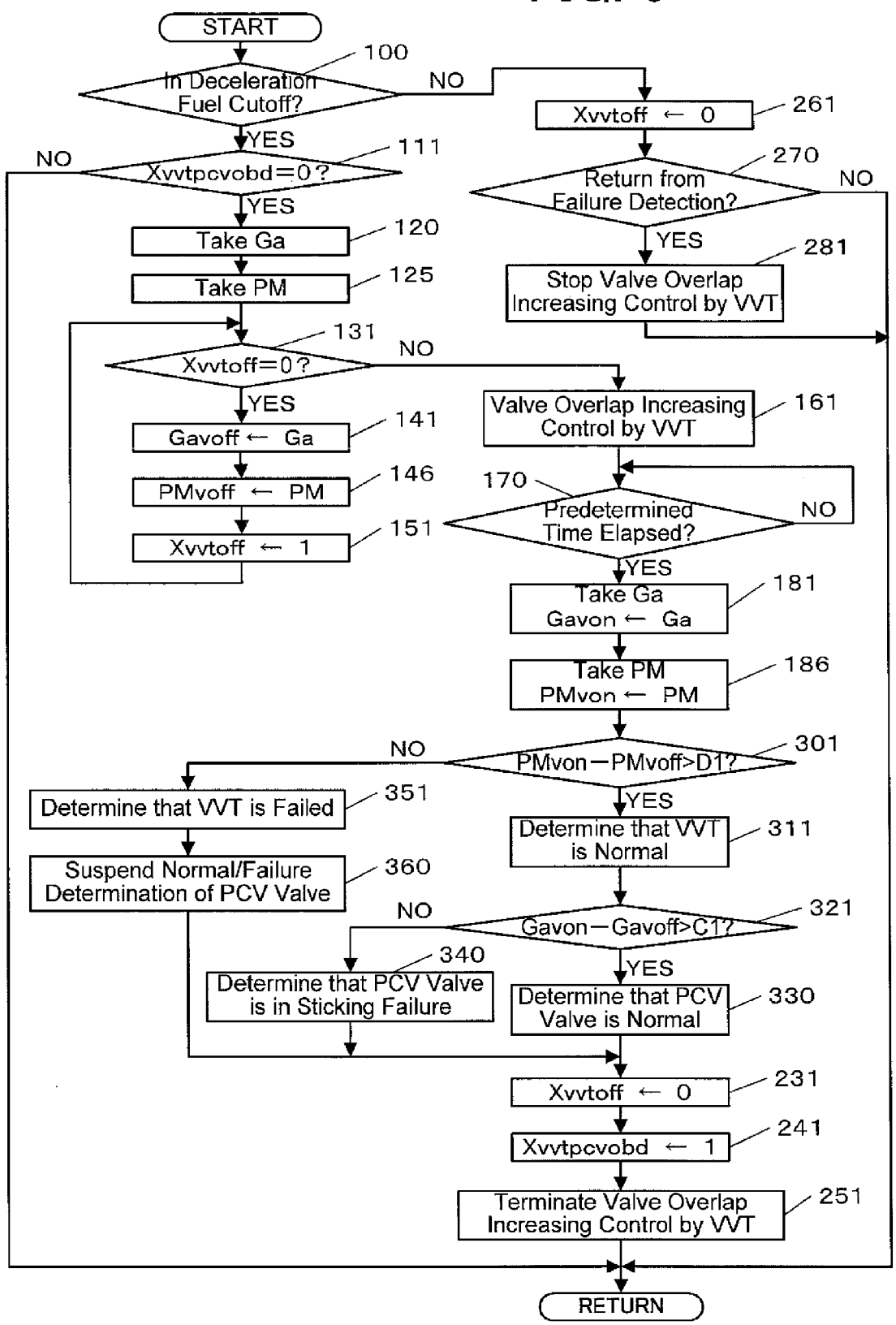
FIG. 9 is a flowchart showing one example of processing details of failure determination in a fourth embodiment.

This embodiment differs from the second embodiment in the processing details for failure detection. FIG. 9 is a flowchart showing one example of the processing details for failure detection in this embodiment. The flowchart in FIG. 9 is different from the flowchart in FIG. 7 in Steps 111, 131, 141, 146, 151, 161, 181, 186, 301, 311, 321, 351, 231, 241, 251, 261, and 281 provided instead of Steps 110, 130, 140, 145, 150, 160, 180, 185, 300 to 320, 350, 230 to 260, and 280 in FIG. 7.

When the processing proceeds to this routine, the ECU 50 determines in Step 111, subsequent to the processing in Step 100, whether or not a failure determination flag Xvvtpcvobd is "0". This flag Xvvtpcvobd is set to "1" when it was determined whether or not the VVT 61 and the PCV valve 67 are failed (failure determination), while it is set to "0" when this failure determination was not performed. If NO in Step 111, the ECU 50 returns the processing to Step 100. If YES in Step 111, the ECU 50 shifts the processing to Step 120.

Subsequently, after execution of the processings in Steps 120 and 125, the ECU 50 determines in Step 131 whether or not a VVT-OFF flag Xvvtoff is "0". This flag Xvvtoff is set to "1" when a VVT-OFF intake amount Gavoff in an OFF state of the VVT 61 is obtained as mentioned later and set to "0" when the VVT-OFF intake amount Gavoff is not obtained. If NO in Step 131, the ECU 50 shifts the processing to Step 161. If YES in Step 131, the ECU 50 shifts the processing to Step 141.

In Step 141, the ECU 50 stores the intake amount Ga taken in Step 120 as a VVT-OFF intake amount Gavoff in the memory. In Step 146, the ECU 50 further stores the intake pressure PM taken in Step 125 as a VVT-OFF intake pressure PMvoff in the memory. In Step 151, the ECU 50 sets the VVT-OFF flag Xvvtoff to "1". Thereafter, the ECU 50 returns the processing to Step 131.

On the other hand, in Step 161 subsequent to Step 131, the ECU 50 controls the VVT 61 to increase the valve overlap. This reduces the magnitude of the intake pressure PM (negative pressure) in the surge tank 3a.

Then, the ECU 50 waits for a lapse of a predetermined time in Step 170 and advances the processing to Step 181. In this Step 181, the ECU 50 takes an intake amount Ga based on a detection value of the air flow meter 54 and stores this taken intake amount Ga as a VVT-ON intake amount Gavon in an ON state of the VVT 61 in the memory.

In Step 186, the ECU 50 takes intake pressure PM based on a detection value of the intake pressure sensor 51 and stores this taken intake pressure PM as a VVT-ON intake pressure PMvon in the ON state of the VVT 61 in the memory.

In Step 301, successively, the ECU 50 determines whether or not a difference between the VVT-ON intake pressure PMvon and the VVT-OFF intake pressure PMvoff is larger than a predetermined value D1. Specifically, the ECU 50 judges whether or not a difference between the intake pressure PM obtained when the VVT 61 is in the ON state and the intake pressure PM obtained when the VVT 61 is in the OFF state is larger to a certain degree. If YES in Step 301, the ECU 50 shifts the processing to Step 311. If NO in Step 301, the ECU 50 shifts the processing to Step 351.

In Step 311, the ECU 50 determines that the VVT 61 is normal. At that time, the ECU 50 can store this fact that the VVT 61 is normal in the memory.

In Step 321, the ECU 50 then determines whether or not a difference between the VVT-ON intake amount Gavon and the VVT-OFF intake amount Gavoff is larger than a predetermined value C1. Specifically, the ECU 50 judges whether or not a difference between the intake amount Ga obtained when the VVT 61 is in the ON state and the intake amount Ga obtained when the VVT 61 is in the OFF state is large to a certain degree. If YES in Step 321, the ECU 50 shifts the processing to Step 330. If NO in Step 321, the ECU 50 shifts the processing to Step 340.

In Step 330, the ECU 50 determines that the PCV valve 67 is normal and shifts the processing to Step 231. At that time, the ECU 50 can store this fact that the PCV valve 67 is normal in the memory.

In Step 340, the ECU 50 determines that the PCV valve 67 is failed by sticking and thus shifts the processing to 231. At that time, the ECU 50 can inform a driver of the fact that the PCV valve 67 is determined to be in the sticking failure and store this fact in the memory.

On the other hand, in Step 351 subsequent to Step 301, the ECU 50 determines that the VVT 61 is failed. At that time the ECU 50 can inform a driver of the fact that the VVT 61 is determined to be failed or store this fact in the memory.

In Step 360, the ECU 50 suspends the normal/failure determination of the PCV valve 67 and shifts the processing to Step 231.

In Step 231, the ECU 50 resets the VVT-OFF flag Xvvtoff to "0". In Step 241, the ECU 50 sets the failure determination flag Xvvtpcvobd to "1".

In Step 251, the ECU 50 terminates the valve overlap increasing control by the VVT 61 and returns the processing to 100.

On the other hand, in Step 261 subsequent to Step 100, the ECU 50 resets the VVT-OFF flag Xvvtoff to "0".

In Step 281 subsequent to Step 270, the ECU 50 stops the valve overlap increasing control by the VVT 61 and returns the processing to Step 100.

According to the above control, during deceleration fuel cutoff of the engine 1, the ECU 50 holds the throttle valve 21 at a predetermined slight opening degree and controls the VVT 61 to increase the valve overlap, thereby changing the intake pressure PM (negative pressure) in the surge tank 3a, and further determines whether or not the VVT 61 is failed based on changes in intake pressure PM detected by the intake pressure sensor 51 before and after the negative pressure changes. When the ECU 50 determines that the VVT 61 is normal, the ECU 50 further determines whether or not the PCV valve 67 is failed by sticking based on changes in intake amount Ga detected by the air flow meter 54 before and after changing of the intake pressure PM (negative pressure) in the surge tank 3a.

According to the failure detection device in the present embodiment as explained above, a determination whether or not the VVT 61 is failed is made as a precondition to judge sticking failure of the PCV valve 67. Thus, the failure of the VVT 61 can also be detected. In the case where the VVT 61 is normal, the VVT 61 is controlled to increase the valve overlap to cause changes in the intake pressure PM in the surge tank 3a as expected. Herein, when the ECU 50 determines that the VVT 61 is normal, the ECU 50 further determines whether or not the PCV valve 67 is failed by sticking based on changes in intake amount Ga detected by the air flow meter 54 before and after changing of the intake pressure PM (negative pressure). Accordingly, the sticking failure of the PCV valve 67 is judged on the precondition that the VVT 61 is normal, that is, on the precondition that the intake pressure PM changes as expected. Thus, that failure can be appropriately judged. This can achieve appropriate failure detection of the PCV valve 67 as well as the advantageous effects in the first embodiment.

Fifth Embodiment

A fifth embodiment embodying a failure detection device for a blow-by gas recirculation apparatus of an engine according to the invention will be explained below referring to the accompanying drawings.

Figure 10:
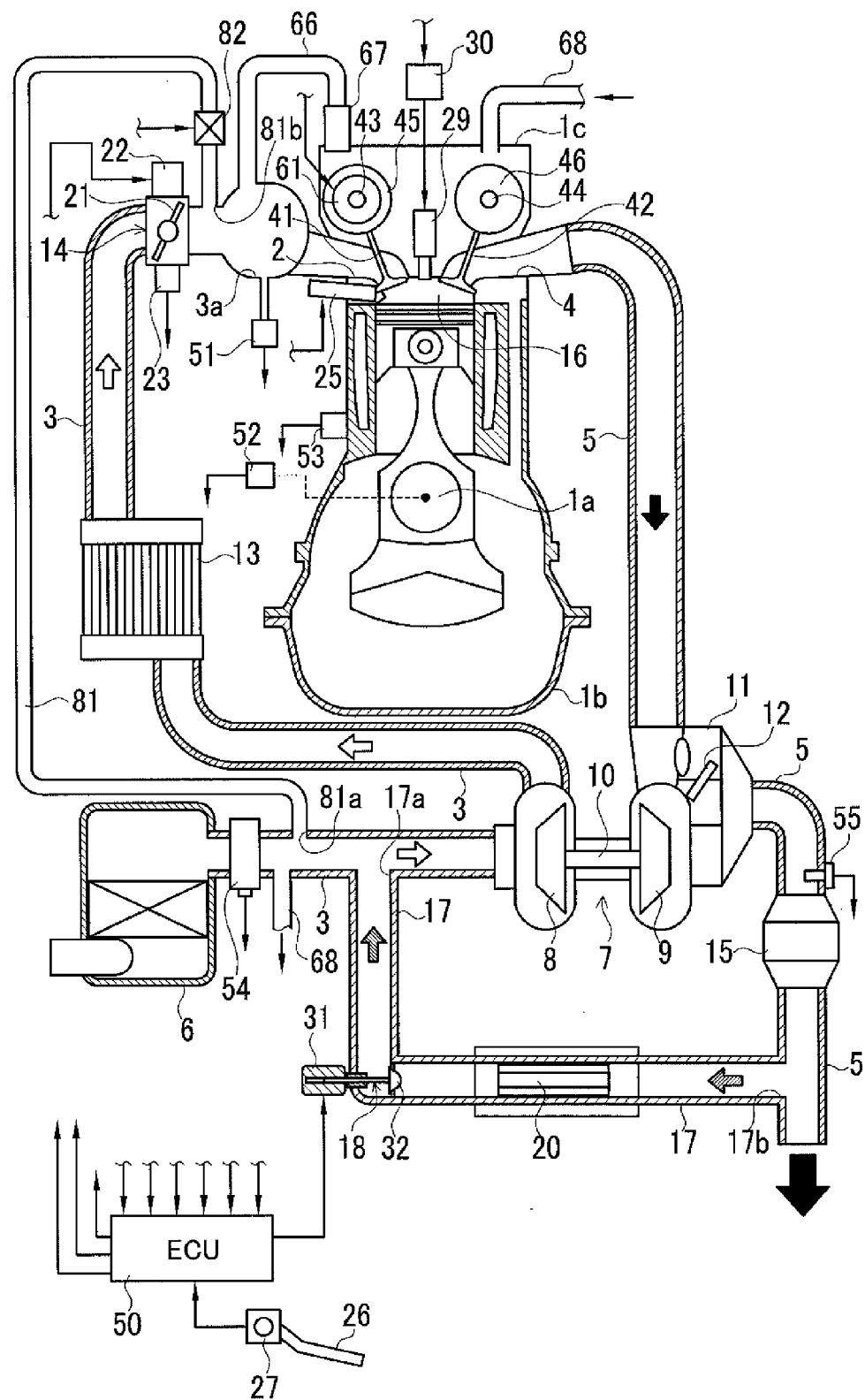
FIG. 10 is a schematic configuration view showing a gasoline engine system including a supercharger and an EGR apparatus in a fifth embodiment.

The fifth embodiment differs from each of the above embodiments in the engine system and the processing details of failure detection. FIG. 10 is a schematic configuration view of a gasoline engine system in this embodiment. This system in the present embodiment differs from the gasoline engine system in FIG. 1 in the addition of a fresh-air induction passage 81 to introduce fresh air to the surge tank 3a and a fresh-air induction valve 82 to regulate the flow of fresh air in the fresh-air induction passage 81. The fresh-air induction passage 81 has an inlet 81a connected to the intake passage 3 upstream of the outlet 17a of the EGR passage 17 and an outlet 81b connected to the intake passage 3 downstream of the throttle valve 21 and upstream of the surge tank 3a. The fresh-air induction valve 82 is an electrically operated valve and controlled by the ECU 50 to regulate the flow of fresh air in the fresh-air induction passage 81.

The engine system in the present embodiment is provided with a low-pressure loop type EGR apparatus instead of the high-pressure loop type EGR apparatus in each of the above embodiments. In the present embodiment, specifically, the inlet 17b of the EGR passage 17 is connected to the exhaust passage 5 downstream of the catalytic converter 15 and outlet 17a is connected to the intake passage 3 upstream of the compressor 8 as shown in FIG. 10. In the EGR passage 17, there are provided the EGR cooler 20 and the EGR valve 18.

In the present embodiment, the fresh-air induction valve 82 corresponds to one example of the intake pressure changing unit of the invention. Specifically, the fresh-air induction valve 82 operates to change the intake pressure PM (negative pressure) in the surge tank 3a. In the present embodiment, the VVT 61 corresponds to one example of another, or second, intake pressure changing unit of the invention. Specifically, the VVT 61 is operated to increase the valve overlap between the intake valve 41 and the exhaust valve 42, thereby changing the intake pressure PM (negative pressure) in the surge tank 3a.

Figure 11:
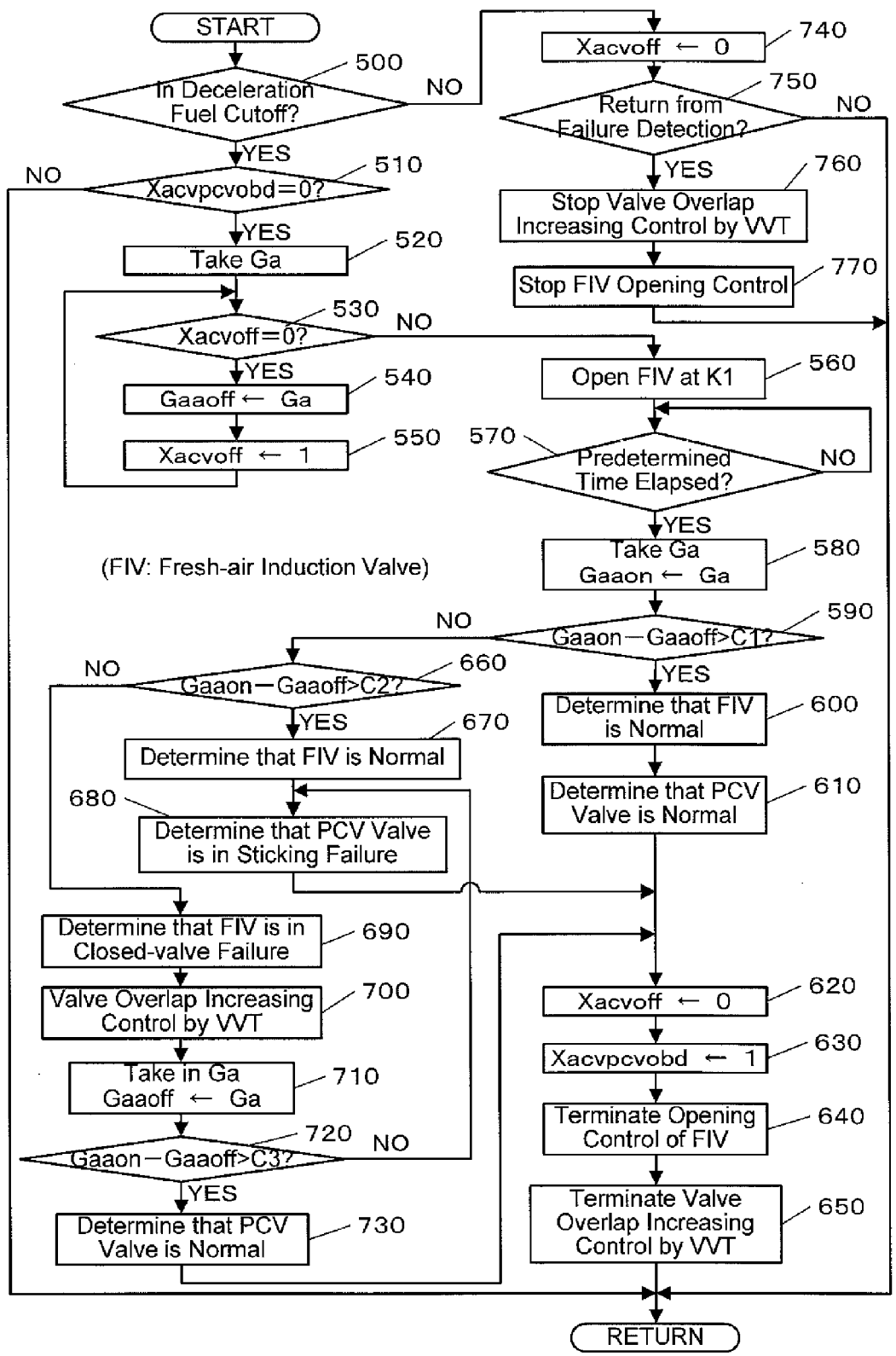
FIG. 11 is a flowchart showing one example of processing details of failure determination in the fifth embodiment.

FIG. 11 is a flowchart showing one example of the processing details for failure detection in the present embodiment. When the processing proceeds to this routine, the ECU 50 first determines in Step 500 whether or not the operating condition of the engine 1 is in deceleration fuel cutoff. If NO in Step 500, the ECU 50 shifts the processing to Step 740. If YES in Step 500, the ECU 50 shifts the processing to Step 510.

In Step 510, the ECU 50 determines whether or not a failure determination flag Xacvpcvobd is "0". This flag Xacvpcvobd is set to "1" when it was determined wither or not the fresh-air induction valve 82 and the PCV valve 67 are failed (failure determination), while it is set to "0" when this failure determination was not performed. If NO in Step 510, the ECU 50 returns the processing to Step 500. If YES in Step 510, the ECU 50 shifts the processing to Step 520.

In Step 520, the ECU 50 takes an intake amount Ga based on a detection value of the air flow meter 54.

In Step 530, the ECU 50 determines whether or not a fresh-air closed flag Xacvoff is "0". This flag Xacvoff is set to "1" when a fresh-air closed intake amount Gaaoff when the fresh-air induction valve 82 is closed as mentioned later is obtained, while it is set to "0" when the fresh-air closed intake amount Gaaoff is not obtained. If NO in Step 530, the ECU 50 shifts the processing to Step 560. In YES in Step 530, the ECU 50 shifts the processing to Step 540.

In Step 540, the ECU 50 stores, in the memory, the intake amount Ga taken in Step 520 as the fresh-air closed intake amount Gaaoff during closing of the fresh-air induction valve 82. In Step 550, the ECU 50 sets the fresh-air closed flag Xacvoff to "1". Then, the ECU 50 returns the processing to Step 530.

On the other hand, in Step 560 subsequent to Step 530, the ECU 50 controls the fresh-air induction valve 82 to open by a predetermined opening degree K1. Thus, the fresh-air induction valve 82 is open from a valve-closed state and hence the intake pressure PM (negative pressure) in the surge tank 3a is alleviated.

In Step 570, the ECU 50 waits for a lapse of a predetermined time and then shifts the processing to Step 580. Herein, the predetermined time can be set to for example "1 second".

In Step 580, the ECU 50 takes an intake amount Ga based on a detection value of the air flow meter 54 and stores the taken intake amount Ga as a fresh-air open intake amount Gaaon during opening of the fresh-air induction valve 82 in the memory.

In Step 590, the ECU 50 determines whether or not a difference between the fresh-air open intake amount Gaaon and the fresh-air closed intake amount Gaaoff is larger than a predetermined value C1. Specifically, the ECU 50 judges whether or not a difference between the intake amount Ga during opening of the fresh-air induction valve 82 and the intake amount Ga during closing of the fresh-air induction valve 82 is larger than the predetermined value C1 to a certain degree. If YES in Step 590, the ECU 50 shifts the processing to Step 600. If NO in Step 590, the ECU 50 shifts the processing to Step 660.

In Step 600, the ECU 50 determines that the fresh-air induction valve 82 is normal. At that time, the ECU 50 can store this fact that the valve 82 is normal.

In Step 610, the ECU 50 determines that the PCV valve 67 is normal. At that time, the ECU 50 can store this fact that the PCV valve 67 is normal in the memory.

In Step 620, the ECU 50 resets the fresh-air closed flag Xacvoff to "0". In Step 630, the ECU 50 sets the failure determination flag Xacvpcvobd to "1".

In Step 640, the ECU 50 terminates the valve opening control of the fresh-air induction valve 82. In Step 650, the ECU 50 terminates the valve overlap increasing control by the VVT 61. Then, the ECU 50 returns the processing to Step 500.

On the other hand, in Step 660 subsequent to Step 590, the ECU 50 determines whether or not a difference between the fresh-air open intake amount Gaaon and the fresh-air closed intake amount Gaaoff is larger than a predetermined value C2 (<C1). Specifically, the ECU 50 judges whether or not a difference between the intake amount Ga during opening of the fresh-air induction valve 82 and the intake amount Ga during closing of this valve 82 is slightly larger than the predetermined value C2b. If YES in Step 660, the ECU 50 shifts the processing to Step 670. If NO in Step 660, the ECU 50 shifts the processing to Step 690.

In Step 670, the ECU 50 determines that the fresh-air induction valve 82 is normal. At that time, the ECU 50 can store this fact that the valve 82 is normal in the memory.

In Step 680, the ECU 50 determines that the PCV valve 67 is in sticking failure. At that time, the ECU 50 can inform a driver of this fact that the PCV valve 67 is determined to be in the sticking failure, and store this fact in the memory. Then, the ECU 50 shifts the processing to Step 620.

In Step 690 subsequent to. Step 660, the ECU 50 determines that the fresh-air induction valve 82 is failed in a valve-closed state. At that time, the ECU 50 can inform a driver of the fact that the fresh-air induction valve 82 is determined to be in the closed-valve failure, and store this fact in the memory.

In Step 700, subsequently, the ECU 50 controls the VVT 61 to increase the valve overlap to thereby change the intake pressure PM (negative pressure) in the surge tank 3a.

In Step 710, the ECU 50 takes the intake amount Ga based on a detection value of the air flow meter 54 and stores, in the memory, the taken intake amount Ga as the fresh-air closed intake amount Gaaoff during closing of the fresh-air induction valve 82.

In Step 720, the ECU 50 determines whether or not a difference between the fresh-air open intake amount Gaaon and the fresh-air closed intake amount Gaaoff is larger than a predetermined value C3 (<C2). Specifically, the ECU 50 judges whether or not a difference between the intake amount Ga during opening of the fresh-air induction valve 82 and the intake amount Ga during closing of the valve 82 is a certain degree. If YES in Step 720, the ECU 50 shifts the processing to Step 730. If NO in Step 720, the ECU 50 returns the processing to Step 680.

In Step 730, the ECU 50 determines that the PCV valve 67 is normal. At that time, the ECU 50 can store this fact that the PCV valve 67 is normal in the memory. Thereafter, the ECU 50 shifts the processing to Step 620.

On the other hand, in Step 740 subsequent to Step 500, the ECU 50 resets the fresh-air closed flag Xacvoff to "0".

In Step 750, the ECU 50 determines whether or not the routine returns from the failure detection of the fresh-air induction valve 82 or the PCV valve 67. If NO in Step 750, the ECU 50 returns the processing to Step 500. If YES, the ECU 50 shifts the processing to Step 760.

In Step 760, the ECU 50 stops the valve overlap increasing control by the VVT 61. In Step 770, furthermore, the ECU 50 stops the valve opening control of the fresh-air induction valve 82 and returns the processing to Step 100.

According to the above control, during deceleration fuel cutoff of the engine 1, the ECU 50 holds the throttle valve 21 at the predetermined slight opening degree, controls the fresh-air induction valve 82 to be forcibly opened, thereby changing the intake pressure PM (negative pressure) in the surge tank 3a, and then determines whether or not the fresh-air induction valve 82 is in closed-valve failure based on changes in intake amount Ga detected by the air flow meter 54 before and after the negative pressure changes. When the ECU 50 determines that the fresh-air induction valve 82 is normal, the ECU 50 further determines whether or not the PCV valve 67 is in sticking failure based on changes in intake amount Ga detected by the air flow meter before and after the intake pressure PM (negative pressure) in the surge tank 3a changes. On the other hand, when the ECU 50 determines that the fresh-air induction valve 82 is in closed-valve failure, the ECU 50 controls the VVT 61 to increase the valve overlap to change the intake pressure PM (negative pressure) in the surge tank 3a, and then determines whether or not the PCV valve 67 is in sticking failure based on change in intake amount Ga detected by the air flow meter 54 before and after the negative pressure changes.

According to the failure detection device in the present embodiment as explained above, since a determination whether the fresh-air induction valve 82 is in closed-valve failure or not is made as a precondition to judge sticking failure of the PCV valve 67, the closed-valve failure of the fresh-air induction valve 82 can also be detected. If the valve 82 is normal, this valve 82 is forcibly opened from a valve-closed state, causing the intake pressure PM (negative pressure) in the surge tank 3a to change as expected. When the ECU 50 determines that the valve 82 is normal, the ECU 50 determines whether or not the PCV valve 67 is in sticking failure based on changes in intake amount Ga detected by the air flow meter 54 before and after changing of the intake pressure PM (negative pressure). Accordingly, sticking failure of the PCV valve 67 is judged on the precondition that the fresh-air induction valve 82 is normal, that is, on the precondition that the intake pressure PM changes as expected. Thus, that failure can be appropriately judged. This can achieve appropriate failure detection of the PCV valve 67 as well as the advantageous effects in the first embodiment.

On the other hand, if the fresh-air induction valve 82 is in closed-valve failure, even when this valve 82 is forcibly opened, the intake pressure PM (negative pressure) in the surge tank 3a will not change as expected. Herein, when the ECU 50 determines that the fresh-air induction valve 82 is in closed-valve failure, the ECU 50 controls the VVT 61 to increase the valve overlap to thereby change the intake pressure PM (negative pressure) in the surge tank 3a, and then determines whether or not the PCV valve 67 is in sticking failure based on changes in intake amount Ga detected by the air flow meter 54 before and after the negative pressure changes. Accordingly, even when the fresh-air induction valve 82 is failed in a valve-closed state, an occasion or step of determining the presence/absence of a failure of the PCV valve 67 can be established. Since the VVT 61 provided in the engine 1 to change the valve timing of the intake valve 41 is also used as another unit or means to change the intake pressure PM, any additional dedicated device does not need to be provided. This makes it possible to effectively detect sticking failure of the PCV valve 67 without increasing the number of dedicated components for failure detection and without increasing size and cost, and also to appropriately detect that failure. Furthermore, the closed-valve failure of the fresh-air induction valve 82 can also be detected. The failure detection of the PCV valve 67 can be achieved more appropriately even when the fresh-air induction valve 82 is in closed-valve failure.

The present invention is not limited to the above embodiments and may be embodied in other specific forms without departing from the essential characteristics thereof.

In the third and fifth embodiments, the VVT 61 is used as another intake pressure changing unit of the invention. Alternatively, the EGR valve or the fresh-air induction valve may be used as the another intake pressure changing unit.

In each of the embodiments, the failure detection device of the present invention is applied to the engine 1 equipped with the supercharger 7. As an alternative, the failure detection device of the invention may be applied to an engine equipped with no supercharge.

In each of the above embodiments, the failure detection device of the invention is embodied in the gasoline engine system. The instant invention may also be embodied in the diesel engine system.

INDUSTRIAL APPLICABILITY

The present invention is utilizable to failure detection of a blow-by gas recirculation apparatus provided in a gasoline engine and a diesel engine.

REFERENCE SIGNS LIST

| | | | |
|---|---|---|---|
| 1 | Engine | 2 | Intake port |
| 3 | Intake passage | 3a | Surge tank |
| 4 | Exhaust port | 5 | Exhaust passage |
| 14 | Electronic throttle device | 16 | Combustion chamber |
| 17 | EGR intake passage | 18 | EGR valve |
| 21 | Throttle valve | 25 | Injector |
| 41 | Intake valve | 42 | Exhaust valve |
| 43 | Camshaft | 44 | Camshaft |
| 45 | Timing pulley | 46 | Timing pulley |
| 50 | ECU | 51 | Intake pressure sensor |
| 54 | Air flow meter | 61 | VVT |
| 66 | Blow-by gas recirculation passage | | |
| 67 | PCV valve | 81 | Fresh-air induction passage |
| 81b | Outlet | 82 | Fresh-air induction valve |
| PM | Intake pressure | Ga | Intake amount |

The invention claimed is:

1. A failure detection device for a blow-by gas recirculation apparatus of an engine, wherein
the engine includes a combustion chamber, an intake passage, an exhaust passage, a fuel supply unit to supply fuel to the combustion chamber, and an intake regulating valve to regulate an intake amount flowing in the intake passage,
the engine is provided with an intake pressure changing unit to change intake pressure in the intake passage downstream of the intake regulating valve and an intake amount detecting unit to detect intake amount flowing in the intake passage upstream of the intake regulating valve to detect an operating condition of the engine, the blow-by gas recirculation apparatus includes a blow-by gas recirculation passage to allow blow-by gas generated in the engine to flow in the intake passage to return to the engine, and a PCV valve configured to be operated in response to negative pressure to regulate a flow rate of blow-by gas in the blow-by gas recirculation passage, the blow-by gas recirculation passage having an outlet connected to the intake passage downstream of the intake regulating valve, and the PCV valve including a pipe-shaped main body, a valve element placed to be able to reciprocate in the main body, and a spring biasing the valve element in a direction to open, and an opening degree of the valve element being determined by balance between negative pressure acting in the main body, a biasing force of the spring and surrounding pressure of the spring, and the failure detection device further includes a failure determining unit configured such that, both during deceleration operation of the engine and when fuel supply by the fuel supply unit is cut off, the failure determining unit holds the intake regulating valve at a predetermined slight opening degree, controls the intake pressure changing unit to change intake pressure in the intake passage downstream of the intake regulating valve, and determines whether or not the PCV valve is failed based on changes in the intake amount detected by the intake amount detecting unit before and after the intake pressure changes.

2. The failure detection device for a blow-by gas recirculation apparatus of an engine according to claim 1, further including an intake pressure detecting unit to detect the intake pressure in the intake passage downstream of the intake regulating valve to detect an operating condition of the engine, wherein the failure determining unit is configured such that, both during deceleration operation of the engine and when fuel supply by the fuel supply unit is cut off, the failure determining unit holds the intake regulating valve at the predetermined slight opening degree, controls the intake pressure changing unit to change the intake pressure in the intake passage downstream of the intake regulating valve, determines whether or not the PCV valve is failed based on changes in the intake pressure detected by the intake pressure detecting unit before and after the intake pressure changes, and when the intake pressure changing unit is determined to be normal, the failure determining unit determines whether or not the PCV valve is failed based on changes in the intake amount detected by the intake amount detecting unit before and after the intake pressure changes.

3. The failure detection device for a blow-by gas recirculation apparatus of an engine according to claim 2, wherein the engine is further provided with another intake pressure changing unit to change the intake pressure in the intake passage downstream of the intake regulating valve, and when the failure determining unit determines that the intake pressure changing unit is failed, the failure determining unit controls the another intake pressure changing unit to change the intake pressure in the intake passage downstream of the intake regulating valve, and determines whether or not the PCV valve is failed based on changes in the intake amount detected by the intake amount detecting unit before and after the intake pressure changes.

4. The failure detection device for a blow-by gas recirculation apparatus of an engine according to claim 1, wherein the engine is further provided with an exhaust recirculation passage to allow part of exhaust gas discharged from the combustion chamber to the exhaust passage to flow in the intake passage to return to the combustion chamber and an exhaust recirculation valve to regulate a flow of the exhaust recirculation passage, the intake pressure changing unit is the exhaust recirculation valve, and both during deceleration operation of the engine and when fuel supply by the fuel supply unit is cut off, the failure determining unit controls the exhaust recirculation valve to be forcibly opened from a valve-closed state to change intake pressure in the intake passage downstream of the intake regulating valve.

5. The failure detection device for a blow-by gas recirculation apparatus of an engine according to claim 2, wherein the engine is further provided with an exhaust recirculation passage to allow part of exhaust gas discharged from the combustion chamber to the exhaust passage to flow in the intake passage to return to the combustion chamber and an exhaust recirculation valve to regulate a flow of the exhaust recirculation passage, the intake pressure changing unit is the exhaust recirculation valve, and both during deceleration operation of the engine and when fuel supply by the fuel supply unit is cut off, the failure determining unit controls the exhaust recirculation valve to be forcibly opened from a valve-closed state to change intake pressure in the intake passage downstream of the intake regulating valve.

6. The failure detection device for a blow-by gas recirculation apparatus of an engine according to claim 1, wherein the engine further includes: an intake port communicated with the intake passage and an exhaust port communicated with the exhaust passage, the intake port and the exhaust port being both provided in the combustion chamber; an intake valve to open and close the intake port; an exhaust valve to open and close the exhaust port, a valve moving mechanism to drive the intake valve and the exhaust valve to open and close in sync with rotation of the engine; and an opening and closing characteristics varying mechanism to change opening and closing characteristics of at least one of the intake valve and the exhaust valve, the intake pressure changing unit is the opening and closing characteristics varying mechanism, and both during deceleration operation of the engine and when fuel supply by the fuel supply unit is cut off, the failure determining unit controls the opening and closing characteristics varying mechanism to change the opening and closing characteristics to change the intake pressure in the intake passage downstream of the intake regulating valve.

7. The failure detection device for a blow-by gas recirculation apparatus of an engine according to claim 2, wherein the engine further includes: an intake port communicated with the intake passage and an exhaust port communicated with the exhaust passage, the intake port and the exhaust port being both provided in the combustion chamber; an intake valve to open and close the intake port; an exhaust valve to open and close the exhaust port, a valve moving mechanism to drive the intake valve and the exhaust valve to open and close in sync with rotation of the engine; and an opening and closing characteristics varying mechanism to change opening and closing characteristics of at least one of the intake valve and the exhaust valve, the intake pressure changing unit is the opening and closing characteristics varying mechanism, and both during deceleration operation of the engine and when fuel supply by the fuel supply unit is cut off, the failure determining unit controls the opening and closing characteristics varying mechanism to change the opening and closing characteristics to change the intake pressure in the intake passage downstream of the intake regulating valve.

8. The failure detection device for a blow-by gas recirculation apparatus of an engine according to claim 1, wherein the engine is further provided with a fresh-air induction passage to introduce fresh air to the intake passage downstream of the intake regulating valve and a fresh-air induction valve to regulate a flow of fresh air in the fresh-air induction passage, the intake pressure changing unit is the fresh-air induction valve, and both during deceleration operation of the engine and when fuel supply by the fuel supply unit is cut off, the failure determining unit controls the fresh-air induction valve to be forcibly opened from a valve-closed state to change the intake pressure in the intake passage downstream of the intake regulating valve.

9. The failure detection device for a blow-by gas recirculation apparatus of an engine according to claim 2, wherein the engine is further provided with a fresh-air induction passage to introduce fresh air to the intake passage downstream of the intake regulating valve and a fresh-air induction valve to regulate a flow of fresh air in the fresh-air induction passage, the intake pressure changing unit is the fresh-air induction valve, and both during deceleration operation of the engine and when fuel supply by the fuel supply unit is cut off, the failure determining unit controls the fresh-air induction valve to be forcibly opened from a valve-closed state to change the intake pressure in the intake passage downstream of the intake regulating valve.

10. A failure detection device for a blow-by gas recirculation apparatus of an engine, wherein the engine includes a combustion chamber, an intake passage, an exhaust passage, a fuel supply unit to supply fuel to the combustion chamber, and an intake regulating valve to regulate an intake amount flowing in the intake passage, wherein the engine is provided with an intake pressure changing unit to change intake pressure in the intake passage downstream of the intake regulating valve and an intake amount detecting unit to detect intake amount flowing in the intake passage upstream of the intake regulating valve to detect an operating condition of the engine, wherein the blow-by gas recirculation apparatus includes a blow-by gas recirculation passage to allow blow-by gas generated in the engine to flow in the intake passage to return to the engine, and a PCV valve configured to be operated in response to negative pressure to regulate a flow rate of blow-by gas in the blow-by gas recirculation passage, the blow-by gas recirculation passage having an outlet connected to the intake passage downstream of the intake regulating valve, wherein the failure detection device further includes a failure determining unit configured such that, both during deceleration operation of the engine and when fuel supply by the fuel supply unit is cut off, the failure determining unit holds the intake regulating valve at a predetermined slight opening degree, controls the intake pressure changing unit to change intake pressure in the intake passage downstream of the intake regulating valve, and determines whether or not the PCV valve is failed based on changes in the intake amount detected by the intake amount detecting unit before and after the intake pressure changes, wherein the failure detection device further includes an intake pressure detecting unit to detect the intake pressure in the intake passage downstream of the intake regulating valve to detect an operating condition of the engine, wherein the failure determining unit is configured such that, both during deceleration operation of the engine and when fuel supply by the fuel supply unit is cut off, the failure determining unit holds the intake regulating valve at the predetermined slight opening degree, controls the intake pressure changing unit to change the intake pressure in the intake passage downstream of the intake regulating valve, determines whether or not the PCV valve is failed based on changes in the intake pressure detected by the intake pressure detecting unit before and after the intake pressure changes, and when the intake pressure changing unit is determined to be normal, the failure determining unit determines whether or not the PCV valve is failed based on changes in the intake amount detected by the intake amount detecting unit before and after the intake pressure changes, wherein the engine is further provided with another intake pressure changing unit to change the intake pressure in the intake passage downstream of the intake regulating valve, wherein when the failure determining unit determines that the intake pressure changing unit is failed, the failure determining unit controls the another intake pressure changing unit to change the intake pressure in the intake passage downstream of the intake regulating valve, and determines whether or not the PCV valve is failed based on changes in the intake amount detected by the intake amount detecting unit before and after the intake pressure changes, the engine is further provided with an exhaust recirculation passage to allow part of exhaust gas discharged from the combustion chamber to the exhaust passage to flow in the intake passage to return to the combustion chamber and an exhaust recirculation valve to regulate a flow of the exhaust recirculation passage, the engine further includes: an intake port communicated with the intake passage and an exhaust port communicated with the exhaust passage, the intake port and the exhaust port being both provided in the combustion chamber; an intake valve to open and close the intake port; an exhaust valve to open and close the exhaust port, a valve moving mechanism to drive the intake valve and the exhaust valve to open and close in sync with rotation of the engine; and an opening and closing characteristics varying mechanism to change opening and closing characteristics of at least one of the intake valve and the exhaust valve, the intake pressure changing unit is the exhaust recirculation valve, the another intake pressure changing unit is the opening and closing characteristics varying mechanism, and both during deceleration operation of the engine and when fuel supply by the fuel supply unit is cut off, the failure determining unit controls the exhaust recirculation valve to be forcibly opened from a valve-closed state to change intake pressure in the intake passage downstream of the intake regulating valve, and determines whether or not the exhaust recirculation valve is failed based on change in the intake pressure detected by the intake pressure detecting unit before and after the intake pressure changes, and when the exhaust recirculation valve is determined to be failed, the failure determining unit operates the opening and closing characteristics varying mechanism to change the opening and closing characteristics to change the intake pressure in the intake passage downstream of the intake regulating valve, and determines whether or not the PCV valve is failed based on changes in the intake amount detected by the intake amount detecting unit before and after the intake pressure changes.

11. A failure detection device for a blow-by gas recirculation apparatus of an engine, wherein the engine includes a combustion chamber, an intake passage, an exhaust passage, a fuel supply unit to supply fuel to the combustion chamber, and an intake regulating valve to regulate an intake amount flowing in the intake passage, wherein the engine is provided with an intake pressure changing unit to change intake pressure in the intake passage downstream of the intake regulating valve and an intake amount detecting unit to detect intake amount flowing in the intake passage upstream of the intake regulating valve to detect an operating condition of the engine, wherein the blow-by gas recirculation apparatus includes a blow-by gas recirculation passage to allow blow-by gas generated in the engine to flow in the intake passage to return to the engine, and a PCV valve configured to be operated in response to negative pressure to regulate a flow rate of blow-by gas in the blow-by gas recirculation passage, the blow-by gas recirculation passage having an outlet connected to the intake passage downstream of the intake regulating valve, wherein the failure detection device further includes a failure determining unit configured such that, both during deceleration operation of the engine and when fuel supply by the fuel supply unit is cut off, the failure determining unit holds the intake regulating valve at a predetermined slight opening degree, controls the intake pressure changing unit to change intake pressure in the intake passage downstream of the intake regulating valve, and determines whether or not the PCV valve is failed based on changes in the intake amount detected by the intake amount detecting unit before and after the intake pressure changes, wherein the failure detection device further includes an intake pressure detecting unit to detect the intake pressure in the intake passage downstream of the intake regulating valve to detect an operating condition of the engine, wherein the failure determining unit is configured such that, both during deceleration operation of the engine and when fuel supply by the fuel supply unit is cut off, the failure determining unit holds the intake regulating valve at the predetermined slight opening degree, controls the intake pressure changing unit to change the intake pressure in the intake passage downstream of the intake regulating valve, determines whether or not the PCV valve is failed based on changes in the intake pressure detected by the intake pressure detecting unit before and after the intake pressure changes, and when the intake pressure changing unit is determined to be normal, the failure determining unit determines whether or not the PCV valve is failed based on changes in the intake amount detected by the intake amount detecting unit before and after the intake pressure changes, wherein the engine is further provided with another intake pressure changing unit to change the intake pressure in the intake passage downstream of the intake regulating valve, wherein when the failure determining unit determines that the intake pressure changing unit is failed, the failure determining unit controls the another intake pressure changing unit to change the intake pressure in the intake passage downstream of the intake regulating valve, and determines whether or not the PCV valve is failed based on changes in the intake amount detected by the intake amount detecting unit before and after the intake pressure changes, the engine further includes: an intake port communicated with the intake passage and an exhaust port communicated with the exhaust passage, the intake port and the exhaust port being both provided in the combustion chamber; an intake valve to open and close the intake port; an exhaust valve to open and close the exhaust port, a valve moving mechanism to drive the intake valve and the exhaust valve to open and close in sync with rotation of the engine; and an opening and closing characteristics varying mechanism to change opening and closing characteristics of at least one of the intake valve and the exhaust valve, the engine is further provided with a fresh-air induction passage to introduce fresh air to the intake passage downstream of the intake regulating valve and a fresh-air induction valve to regulate a flow of fresh air in the fresh-air induction passage, the intake pressure changing unit is the fresh-air induction valve, the another intake pressure changing unit is the opening and closing characteristics varying mechanism, and both during deceleration operation of the engine and when fuel supply by the fuel supply unit is cut off, the failure determining unit controls the fresh-air induction valve to be forcibly opened from a valve-closed state to change the intake pressure in the intake passage downstream of the intake regulating valve, and determines whether or not the fresh-air induction valve is failed based on change in the intake amount detected by the intake amount detecting unit before and after the intake pressure changes, and when fresh-air induction valve is determined to be failed, the failure determining unit operates the opening and closing characteristics varying mechanism to change the intake pressure in the intake passage downstream of the intake regulating valve, and further determines whether or not the PCV valve is failed based on changes in the intake amount detected by the intake amount detecting unit before and after the intake pressure changes.

* * * * *